(12) United States Patent
Li et al.

(10) Patent No.: US 7,916,794 B2
(45) Date of Patent: Mar. 29, 2011

(54) SYSTEM AND PROCESS FOR BROADCAST AND COMMUNICATION WITH VERY LOW BIT-RATE BI-LEVEL OR SKETCH VIDEO

(75) Inventors: Jiang Li, Beijing (CN); Heung-Yeung Shum, Beijing (CN); Gang Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1975 days.

(21) Appl. No.: 10/931,769

(22) Filed: Aug. 31, 2004

(65) Prior Publication Data

US 2005/0041739 A1     Feb. 24, 2005

Related U.S. Application Data

(63) Continuation of application No. 09/844,549, filed on Apr. 28, 2001, now Pat. No. 6,888,893.

(51) Int. Cl.
    *H04N 7/18* (2006.01)
(52) U.S. Cl. .............................. 375/240.26; 375/240.01
(58) Field of Classification Search . 375/240.01–240.29
    See application file for complete search history.

(56) References Cited

U.S. PATENT DOCUMENTS

| | | | |
|---|---|---|---|
| 5,345,317 A | | 9/1994 | Katsuno et al. |
| 5,521,990 A | * | 5/1996 | Ishizawa et al. ............. 382/270 |
| 5,543,939 A | | 8/1996 | Harvey et al. |
| 5,611,038 A | * | 3/1997 | Shaw et al. .................. 715/202 |
| 5,790,717 A | | 8/1998 | Judd |
| 5,848,198 A | | 12/1998 | Penn |
| 5,864,638 A | * | 1/1999 | Ishizawa et al. ............. 382/270 |
| 6,091,777 A | | 7/2000 | Guetz et al. |
| 6,101,274 A | | 8/2000 | Pizano et al. |
| 6,219,043 B1 | * | 4/2001 | Yogeshwar et al. ............ 341/55 |
| 6,269,192 B1 | * | 7/2001 | Sodagar et al. ............... 382/240 |
| 6,339,620 B1 | * | 1/2002 | Yamaguchi et al. ..... 375/240.26 |
| 6,597,811 B1 | | 7/2003 | Batkilim et al. |
| 6,674,437 B1 | | 1/2004 | Rose et al. |
| 6,674,900 B1 | | 1/2004 | Ma et al. |
| 7,136,066 B2 | | 11/2006 | Li et al. |
| 7,305,151 B2 | | 12/2007 | Shiiyama |
| 7,359,004 B2 | * | 4/2008 | Yu et al. ..................... 348/390.1 |

OTHER PUBLICATIONS

Nguyen, Phu K., Notice of Allowance, U.S. Appl. No. 11/067,554, Sep. 24, 2008.
Nguyen, Phu K., Office Action, U.S. Appl. No. 12/288,281, Mar. 22, 2010.
Hentschel et al., Harmonic and intermodulation due to requantization of fixed-point numbers, IEEE, 1998, pp. 1-4.

(Continued)

*Primary Examiner* — Andy S Rao
(74) *Attorney, Agent, or Firm* — Lyon & Harr, LLP; Richard T. Lyon

(57) ABSTRACT

A system and process for broadcast and communication with bi-level or sketch video at extremely low bandwidths is described. Essentially, bi-level and sketch video presents the outlines of the objects in a scene being depicted. Bi-level and sketch video provides a clearer shape, smoother motion, shorter initial latency and cheaper computational cost than do conventional DCT-based video compression methods. This is accomplished by converting each color or gray-scale image frame to bi-level or sketch image frame using adaptive thresholding method, compressing bi-level or sketch image frames into bi-level or sketch video using adaptive context-based arithmetic coding method. Bi-level or sketch video is particularly suitable to such small devices as Pocket PCs and mobile phones that possess small display screen, low bandwidth connection, and light computational power.

34 Claims, 18 Drawing Sheets

OTHER PUBLICATIONS

Li, J., G. Chen, J. Xu, Y. Wang, H. Zhou, K. Yu, K. T. Ng, and H.-Y. Shum, Bi-level video: Video communication at very low bit rates, ACM Multimedia Conf., Sep. 30-Oct. 5, 2001, pp. 392-400, Ottawa, Ontario, Canada.

Otsu, N., A threshold selection method for gray-level histogram, IEEE Trans. on Sys., Man and Cybernetics SMC-8, 1978, vol. 2, pp. 630-632.

Sahoo, P. K., S. Soltani, and A. K. C. Wong, A survey of thresholding techniques, Comp. Vision Graphics Image Processing, 1998, pp. 233-260, vol. 41.

Chung, D. J., Office Action, U.S. Appl. No. 10/302,653, Dec. 13, 2004.

Lyon, K., Office Action Response, U.S. Appl. No. 10/302,653, Feb. 25, 2005.

Chung, D. J., Office Action, U.S. Appl. No. 10/302,653, Jun. 17, 2005.

Lyon, K., Office Action Response, U.S. Appl. No. 10/302,653, Sep. 17, 2005.

Chung, D. J., Notice of Allowance, U.S. Appl. No. 10/302,653, May 22, 2006.

Nguyen, P. K., Office Action, U.S. Appl. No. 11/067,554, Mar. 8, 2007.

Lyon, K., Office Action Response, U.S. Appl. No. 11/067,554, May 7, 2007.

Nguyen, P. K., Office Action, U.S. Appl. No. 11/067,554, Jan. 10, 2008.

Vo, T. T., Office Action, U.S. Appl. No. 10/302,624, Mar. 20, 2006.

Lyon, K., Office Action Response, U.S. Appl. No. 10/302,624, Apr. 25, 2006.

Vo, T. T., Notice of Allowance, U.S. Appl. No. 10/302,624, May 11, 2006.

Phu K. Nguyen, U.S. Appl. No. 12/288,281, U.S. Office Action, Aug. 31, 2010.

* cited by examiner

SYSTEM AND PROCESS FOR BROADCAST AND COMMUNICATION WITH VERY LOW BIT-RATE BI-LEVEL OR SKETCH VIDEO

CROSS-REFERENCE TO RELATED APPLICATIONS

This application is a continuation of a prior application entitled "A SYSTEM AND PROCESS FOR BROADCAST AND COMMUNICATION WITH VERY LOW BIT-RATE BI-LEVEL OR SKETCH VIDEO" which was assigned Ser. No. 09/844,549 and filed Apr. 28, 2001 now U.S. Pat. No. 6,888,893.

BACKGROUND

1. Technical Field

The invention is related to video broadcast and communication, and more particularly to a system and process for broadcast and communication with very low bit-rate bi-level or sketch video.

2. Background Art

Video programs, having both audio and video components, are often broadcast from a single sender to multiple, geographically distributed receivers, who have all "tuned" to that sender. Commonly, the signals are broadcast from the sender by a terrestrial antenna, but satellite and wired solutions also exist. It is also possible to use the Internet infrastructure to broadcast video programs. This is typically accomplished using the Internet Protocol (IP) unicast or multicast mechanism and its associated protocols. An Internet broadcast is provided to the set of receivers who have first "subscribed" to the information. However, existing processes for encoding and decoding video programs for remote presentation or broadcast typically require a broad bandwidth. For example, video broadcast software that employs MPEG techniques [1, 2, 3] such as Microsoft Corporation's Windows Media™ player and RealNetworks Incorporation's RealPlayer usually only play smoothly if bandwidths above 20-30 kilobits per second (Kbps) are available. Similar situations exist in video communications used in applications such as video phones and video conferencing. For example, video communication software that employs MPEG [1, 2, 3] or H.263 [4] techniques such as Microsoft Corporation's Windows NetMeeting and CUseeMe Networks Incorporation's CUSeeMe usually only play smoothly if bandwidths above 30-40 Kbps are available.

Essentially, the previous video compression methods such as MPEG, MPEG2, MPEG4 and H.263 only work well on bandwidths above approximately 20-30 Kbps in an image resolution of quarter common intermediate format (QCIF) (176×144). If these methods are employed at very low bandwidth, the resultant images will look like a collection of color blocks and the motion in the scene will become discontinuous. The block effects of these methods originate from the common architecture of MPEG, MPEG2, MPEG4 and H.263, discrete cosine transform (DCT) based coding. In general, DCT-based coding groups pixels into blocks, e.g. 8×8 or 16×16 pixels blocks. These blocks are transformed from spatial domain into a set of DCT coefficients in the frequency domain. Each of these coefficients is weighted according to the corresponding DCT basis waveform. These coefficients are then quantized, and nonzero quantized values are compressed using an entropy coder. As a result, the low spatial frequency values that represent the "basic colors" of the blocks possess a high priority. Thus, if DCT-based compression methods work in very low bandwidth condition, the basic colors of the blocks will be kept in preference.

While the above compression methods would not present a problem in situations where broad bandwidths are available, this is not the case when the video broadcast or communication is to be performed using low bandwidth devices, such as handheld PCs, palm-size PCs or mobile phones. These devices typically operate at bandwidths around 9.6 to 28.8 Kbps, but can operate even below 9.6 Kbps. When a typical broadcast color video is viewed on a low bandwidth device the result is generally unsatisfactory. As indicated above, the images are filled with color blocks and the motions are no longer smooth.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [1, 2, 3]. A listing of references including the publications corresponding to each designator can be found at the end of the Detailed Description section.

SUMMARY

The present invention in one embodiment is related to a new system and process for broadcast and communication with bi-level video at extremely low bandwidths (e.g., 9.6 Kbps for video as part of a broadcast and 19.2 Kbps for bi-directional video as part of a communication), which provides a clear image and smooth motion. This is accomplished by converting color or gray-scale video to a bi-level video. Each frame of a bi-level video consists of a single rectangular bit plane, with each pixel taking on one of just two possible colors (e.g., black and white). Essentially, a bi-level video presents the outlines of the objects in a scene being depicted. This has particular advantage when viewing a video on one of the aforementioned low bandwidth device because bi-level video produces a much sharper image on the smaller screens typically found on these devices, than does a full color or gray scale video. For example, with facial expressions, the motion of the outlines of face, eyes and mouth delivers more information, than the colors of the face.

The process of broadcast or communication with bi-level video according to the present invention is preceded by obtaining or capturing a digitized video. In a video broadcast application, the video capture process could be either real-time or offline, while in a video communication application, the video capture process must be real-time. This digitized video can be either a full-color or gray-scale video. The input source video is first split into audio and video portions. Once split, each image frame of the video portion is decompressed (if necessary). The image frame sequence is then converted into a bi-level video and compressed for transmission. While the video component of the input video is decompressed, converted and then recompressed, the audio component of the input video can be processed concurrently. The processing of the audio component entails decompressing the audio data using standard methods specific to the type of audio compression used to compress the data. Preferably this decompression would also include a standard noise reduction procedure. The audio data is then recompressed. In this case it is preferred that a very low bit-rate audio compression method be employed to minimize the amount of data that must be transmitted.

After the compressed bi-level video has been generated, and its associated audio data has been compressed, the audio and video components are synchronized and combined to produce a complete bi-level video. This completed bi-level video is ready to be transmitted. This entails packaging the bi-level video using the packing technique applicable to the transmission method. For example, if the bi-level video is to be transmitted over the Internet, the data would be packetized via Internet protocols.

The conversion of the image frame sequence into a bi-level video and its compression for transmission involves several procedures. Specifically, if the input video is a full color video, each frame is first converted to a gray scale frame. Each gray scale image frame, except the first frame is then put through an static region detection and duplication procedure to reduce the noise effects caused by lighting conditions that varied when the input video was captured. Next, an adaptive threshold method is employed to calculate a threshold gray scale level for each frame. The modified gray scale frames produced via the static region detection and duplication procedure are then processed using the computed threshold to divide the pixels of each frame pixels into whatever two bi-level colors are being employed (e.g., such as black and white). This dividing procedure includes assigning a confidence level value to each pixel that is indicative of how likely the pixel is to be the color indicated by the threshold. After that, each frame is compressed using an adaptive context-based arithmetic coding technique. In addition, a rate control algorithm that employs factor adjustment and frame dropping is used to limit the bit rate at which compressed video data is output to within a given bandwidth. The bit stream representing the compressed bi-level video frames is then output.

As for the static region detection and duplication procedure, this involves considering the gray scale value of each pixel in each input video frame in turn beginning with the second frame. One approach to detecting static regions is to use Laplacian of an image. The Laplacian of a pixel is the second derivative of intensity at that pixel. It represents the relative intensity relation between the pixel and its neighbors. Specifically, a Laplacian is computed for each target pixel and the other pixels in a prescribed square surrounding the target pixel in the frame of the input video under consideration. Similarly, a Laplacian is computed for the pixel in the previous frame corresponding in location to the target pixel, as well as the pixels in that frame corresponding in location to the pixels in the aforementioned square. Then, the Laplacians computed for each corresponding pixel between the frames are subtracted from each other and the absolute value of the difference for each pixel location is summed. These summed differences are designated as the SAD of the target pixel. Preferably, nine pixels are chosen as the length of the square (which would thus contain 81 pixels), with the target pixel being centered in the block. It is then determined if the SAD of the target pixel is greater than a prescribed dissimilarity threshold, which is preferably between about 1.0 and 3.0. If the SAD is greater than the dissimilarity threshold, then the target pixel is marked as dissimilar to the corresponding pixel in the previous frame. In addition, the pixel value of the target pixel is retained. If, however, the SAD is determined not to be greater than the dissimilarity threshold, then the target pixel is marked as similar to the corresponding pixel in the previous frame. In this case, the gray-level value is copied from the corresponding pixel in the previous frame and assigned to the target pixel location in lieu of the actual value. Further, the imported value is compensated by the difference of thresholds of two consecutive frames. The calculation of these thresholds will be discussed next.

The pixels of each frame of the input video must be converted to one or the other of the two bi-level colors. For example, if the bi-level colors are to be black and white, then the gray-scale values of each pixel of each frame of the input video is designated as either black or white. One way of accomplishing this task is to establish a threshold gray-scale value. This gray-scale threshold is computed by first making an initial guess at a threshold, and then refining it by consecutive passes through the frame. Specifically, the initial guess at the threshold is simply the mean gray level of all the pixels in the frame under consideration. This threshold is then used to collect statistics on the two regions obtained. Namely, the mean gray level for all pixels below the initial threshold is computed, as is the mean level of the pixels greater than or equal to the initial threshold. Next, a new estimate of the threshold is computed as the average of the mean levels in each pixel class, and the process is repeated using this threshold. When no change in threshold is found in two consecutive passes through the image, the process stops, and the last computed threshold is designated as the selected threshold for the frame under consideration. There may, however, be some input videos for which this automatic thresholding method will not produce the optimal thresholds that result in the best visual quality for the bi-level video. One way of addressing this problem is to allow user to adjust a threshold compensation value manually.

While the decision as to whether a pixel in a gray-level image frame is converted to a one or the other of the bi-level pixel values to form a bi-level video frame, can be determined by the single threshold value, it can be advantageous to employ a threshold band instead. Specifically, this threshold band represents a region around the computed threshold in which the decision as to whether a pixel should be designated as one of the other of the bi-level colors is a close call. It has been found that a value within a range of 0 to 5 gray scale levels on either side of the computed threshold value sufficiently characterizes the so-called close call region. Specifically, the gray scale value of each pixel of each input video frame is considered in turn. It is first determined whether the gray-level value of the pixel under consideration, less the threshold value computed for the image frame containing the pixel, is greater than the prescribed band. If it is, the bi-level value of the pixel is designated to be the lighter of the two bi-level colors (e.g., white). If, however, it is determined the aforementioned difference is not greater than the prescribed band, then it is determined whether the gray-level value of the pixel, minus the threshold value, is less than the band. If it is less, then the bi-level value of the pixel is designated to be the darker of the two bi-level colors (e.g., black). If, however, the aforementioned difference shows that the gray scale value of the pixel under consideration is within the band, the pixel value will be set to whatever value is predicted for the pixel under consideration in a subsequent arithmetic coding process to be discussed next.

A modified adaptive context-based arithmetic encoding scheme is used to compress the bi-level image sequences. Similar to MPEG4 shape coding [10], prior to coding the first pixel, the arithmetic encoder is initialized. Each binary pixel is then encoded in raster order. The general process for encoding a given pixel is: (a) computing a context number; (b) indexing a probability table using the context number; and (c) using the indexed probability to drive an arithmetic encoder. When the final pixel has been processed, the arithmetic code is terminated.

In general, the same template and context construction scheme as those in MPEG4 [10] are applied. For intra coded frames (i.e., I-frames), a 10 bit context constructed with 10 pixels in the same frame is built for each pixel. For inter coded frames (i.e., p-frames), temporal redundancy is exploited by using pixels from the previous frame to make up part of the context. Specifically, a 9 bit context constructed with 5 pixels in the previous frame and 4 pixels in the same frame is built.

One difference of the present adaptive context-based arithmetic coding process compared to MPEG4 Shape coding is that the present method codes the whole frame rather than lots of blocks and the probability table is adaptively constructed during coding. In other words, an adaptive arithmetic coder is used rather than arithmetic coder with a fixed probability table. In the present method, the initial probability of each context number could be quoted from a pre-trained table or all set equal to ½. The latter is called a "½" table. A pre-trained table can be generated from conventional bi-level video clips or previous frames in the same image sequence. In either case, statistical results are incorporated into the probability table during encoding. This is why the present coding scheme is called "adaptive coding". If computational power permits, both initial tables can be used and the one that produces least bits selected.

Certain frames are also preferably designated as intra-frames (i.e., I-frames), while a series of frames following each I-frame in the bi-level video sequence are designated as inter-frames (i.e., p-frames). All the pixels of an I-frame are encoded, whereas only those pixels found within a bounding box are coded for a p-frame. This bounding box represents the smallest rectangle that can encompass all the areas of dissimilarity in a frame. The similarity or dissimilarity of the pixels in the frame were determined previously in the static region detection and duplication procedure. The pixels in the p-frames outside the bounding box are deemed to be the same as the last-preceding frame. It is noted that the location and size of the bounding box in the overall bi-level image frame of a p-frame are added to the bit stream data associated with that p-frame. This is so the receiver can reconstruct the entire bi-level frame from just the encoded data by assuming the pixels outside the bounding box are the same as the correspondingly located pixels in the last frame preceding the p-frame under consideration.

In regard to the use of I-frames and p-frames, each frame can be compressed with the aforementioned adaptive context-based arithmetic encoding scheme in the intra or inter mode. Both modes result in the generation of a single binary arithmetic codeword. The various coding modes are characterized by their context computation and the probability table used. However, for inter mode, only pixels within the bounding box are encoded. When building contexts, any pixels outside the limits of an I-frame that are to the left, right and above are assumed to be zero. Finally, in addition to the pre-trained table and the "½" table, p-frames can also be treated as I-frames and encoded using an I-frame table provided that such a table result in the minimum bits being produced.

A rate control mechanism can optionally be implemented in the present bi-level video coding process, as well. Essentially, this rate control involves adaptively adjusting the width of the aforementioned threshold band or the dissimilarity threshold, or preferably both, to control the bit rate of the compressed bi-level video. A simple rate control scale factor table is preferably used to provide the desired adaptive rate control adjustment. Specifically, a rate control table is established that has a hierarchical sequence of rate control scale factors each of which is assigned values for the width of the threshold band and/or the dissimilarity threshold. The values assigned to a rate control scale factor higher in the hierarchy of the sequence are the same or larger than the values assigned to a lower level scale factor. Initial values for the width of threshold band and the dissimilarity threshold are selected to coincide with one of the rate control scale factors of the rate control table, prior to generating the first bi-level video frame from the input video. The bi-level video frames are then generated in sequence using the selected width of the threshold band and dissimilarity threshold as described previously. Each bi-level frame generated is sequentially encoded using the aforementioned adaptive context-based arithmetic coding technique. The resulting data is buffered pending its output in a buffer having a prescribed size. As the data associated with each frame is buffered, it is determined if the accumulated bits exceed the half-size of the buffer by a prescribed percentage (e.g., about 15%). Whenever the accumulated bits exceed the half-size of the buffer by the prescribed percentage, it is also determined if the accumulated bits exceed the total buffer size. If so, the bits associated with the current frame are deleted from the buffer. In addition, the rate control scale factor is set to its top value. If, however, the accumulated bits do not exceed the total buffer size but still exceeds 15% of the buffer's half-size, then the current rate control scale factor is increased by one, that is unless it is already at the top level. Conversely, if the half-size of the buffer is not exceeded by the prescribed percentage, then it is determined whether the accumulated bits are lower than the half-size of the buffer by a prescribed percentage (e.g., about 15%). If not, the next frame is selected for encoding, assuming there is one. However, whenever the accumulated bits are lower than the half-size of the buffer by the prescribed percentage, the rate control scale factor is decreased by one, unless it is already at the bottom level. It is next determined if the above actions resulted in a change to the rate control scale factor. If not, then the next frame is selected for encoding (if there is one). Conversely, if it is determined that the rate control scale factor was changed, then the values for the width of the threshold band and/or the dissimilarity threshold associated with the new scale factor are read from the rate control table, and used as the current value(s) for use in processing the next frame of the bi-level video. This process then repeated for each bi-level frame generated.

It is noted that another difference between the present adaptive context-based arithmetic encoding scheme and standard MPEG4 Shape Coding is that a lossy mechanism is introduced with a view to the specific scenarios of video communication. Specifically, the half-width of threshold band is determined in rate control process described above, and then used in the adaptive context-based arithmetic encoding process. For those pixels whose confidence levels fall within the threshold band, the bi-level values of the pixels are assigned according to the indexed probability in probability table. Therefore a higher compression ratio can be reached.

The transmitted bi-level video in a broadcast or communication generated in accordance with the foregoing process will be received by a receiving device which will "play" the bi-level video. The receiving device essentially plays the bi-level video by decompressing it and then displaying the decompressed image frames in sequence. In addition, if the receiving device has sound capability, the receiver will also decompress and play the audio components of the bi-level video. The receiving device itself can be any of the previously mentioned low bit-rate devices such as handheld PCs, palm-size PCs, or mobile phones, although this need not be the case. Generally, the bi-level video can be played on any device having a processor capable of decoding the incoming video data and a display capable of displaying bi-level images.

As discussed previously, the bi-level video will have been packaged for transmission over the desired medium. Thus, the first task in playing a bi-level video is to unpack the incoming video data using the standard unpacking technique appropriate for the transmission medium. Next, the incoming data is split to separate the audio and video components of the video. This results in a compressed bi-level image frame sequence and an associated compressed audio component. The bi-level video image sequence is then decompressed. As the incoming bi-level video image sequence is decompressed, it can be rendered for display by the receiving device. This is accomplished using a standard rendering procedure appropriate for the receiving device.

Concurrently with the decompression of the compressed bi-level video image sequence, the audio components are also processed. This entails first decompressing the audio component of the incoming bi-level video. The audio decompression is accomplished using a method corresponding to the previously described very low bit-rate audio compression method. Finally, the decompressed bi-level video image frame sequence and decompressed audio are synchronized and played together.

The decompression of the image frames of the bi-level video involves several procedures. Specifically, the image frame data is decompressed using an adaptive, context-based, arithmetic decoding process. However, it is noted that the decoding includes using any of the probability tables discussed above in connection with the coding of the bi-level video. The particular table used to decode the data can be identified in the bit stream or data file associated with the compressed video. In addition, the decoding process employs the same two-frame template used in the encoding process described above. Further, since the encoded bi-level video preferably includes both I-frames and p-frames, before any decoding takes place, an I-frame is identified according to the mark in the transmitted bit stream. Those bi-level image frames in the frame sequence falling between a pair of consecutive I-frames are designated as p-frames. The I-frames and p-frames are both decoded using the adaptive context-based arithmetic decoding technique and the probability table identified for that frame. However, while the data associated with an I-frame represents all the pixels in the overall bi-level image frame, the data associated with a p-frame represents only those pixels contained within the previously-described bounding box associated with that p-frame. Accordingly, when a p-frame is decoded, the location and size of the bounding box in the overall bi-level image frame of a p-frame is read from the incoming data associated with that p-frame. The portion of the overall bi-level frame outside the bounding box can then be reconstructed by assuming the pixel values in that region are the same as the correspondingly located pixels in the last frame preceding the p-frame being decoded.

An alternate embodiment of the present invention for generating video for broadcasting and communication at extremely low bandwidths is accomplished by converting color or gray-scale video to a "sketch" video. A sketch video is represented by the motions of line drawings that depict the outlines of the objects in a scene. This has particular advantage when viewing a video on one of the aforementioned low bandwidth devices because sketch video also produces a sharper appearance on the smaller screens typically found on these devices, than does a full color video or gray scale video.

Similar to the generation of bi-level video, the process of broadcast and communication with sketch video is preceded by obtaining or capturing a digitized video. This digitized video can be either a full-color video or a gray-scale video. The input source video is split into the audio and video portions. Once split, each frame of the video portion is decompressed (if necessary). Optionally if the video being encoded consists of a person speaking, such as in a video of a lecture or speech, only the speaker is of interest and not the background. Thus, an opportunity exists to eliminate some of the video data that must be encoded and transmitted by eliminating the unwanted background. This can be accomplished using a standard face tracking procedure and creating new image frames depicting only the speaker. Preferably, the extracted face of the speaker would be scaled to fill substantially the entire image frame.

The image frame is next converted from color to gray scale if it was originally captured in color. The converted image frame (or the original image frame if initially captured in gray-scale), then undergoes an edge detection process in which the edge pixels of the objects in the image frame are identified. The resulting line drawing represents the aforementioned sketch image frame.

The sketch image frame could be transmitted as is, however, it is preferred that it first be compressed to further reduce the bandwidth required to transmit the resulting video. Methods that could be employed to compress the sketch image frame involve using JBIG, MPEG shape coding or the aforementioned bi-level video coding. For example, bi-level video coding procedure could be performed on the sketch image frame to reduce the amount of data that must be transmitted. It is noted that the sketch image frame is essentially a special case of a bi-level image. As such other bi-level image compression methods other than bi-level video coding could also be implemented.

Another type of compression methods that could be used involves vectorizing the sketch frame image. The first step in this vectorization process is to scan the image frame pixel by pixel to identify all "connected" edge pixel locations. Preferably, only those edge pixels that are found to be adjacent to each other horizontally, vertically or diagonally (i.e., a 8-connected region) are identified. In cases where the scan identifies patterns of connected edge pixels that include one or more branches, the branching pattern is arbitrarily divided into separate non-branching connected patterns. Once the connected edge pixel patterns are defined, the next phase of the vectorization process is to characterize each of the patterns using spline techniques. In this way each of the patterns is characterized by a spline and its associated set of control point locations. A mixture of different splines could also be employed as some spline types will characterize certain patterns better that others. If a mixture of splines is used, then an indicator identifying the spline type would be included with the control point data associated with each pattern to facilitate the decoding of the vectorized image frame.

The vectorized sketch video can also be represented by I-frames and p-frames. For each I-frame, the hierarchy of splines and the positions of all the control points of splines are recorded and compressed using conventional coding methods such as Huffman coding. For each P-frame, only the differences of hierarchy or topological structures between current frame and previous frame and shift of control points of splines are recorded and compressed using conventional coding methods such as Huffman coding.

While the video component of the input video is decompressed, converted and then recompressed, the audio component of the input video can be processed concurrently. The processing of the audio component entails decompressing the audio data using standard methods specific to the type of audio compression used to compress the data. Preferably this decompression would also include a standard noise reduction procedure. The audio data is then recompressed. In this case it is preferred that a very low bit-rate audio compression method be employed to minimize the amount of data that must be transmitted.

After the compressed sketch video has been generated, and its associated audio data has been compressed, the audio and video components are synchronized and combined to produce a complete sketch video. This completed sketch video is ready to be transmitted. Transmitting the video entails packaging the sketch video using the packetizing technique applicable to the transmission method. For example, if the sketch video is to be transmitted over the Internet, the data would be packetized via Internet protocols.

The transmitted sketch video generated in accordance with the foregoing process is next received by a receiving device. The receiving device essentially "plays" the sketch video by decompressing it and then displaying the decompressed image frames in sequence. In addition, if the receiving device has sound capability, the receiver will also decompress and play the audio components of the sketch video. The receiving device itself can be any of the previously mentioned low bit-rate devices such as a hand-held PC, palm-sized PC, or mobile phone, although this need not be the case. Generally, the sketch video can be played on any device having a processor capable of decoding the incoming video data and a display capable of displaying bi-level images.

As discussed previously, the sketch video will have been packaged for transmission over the desired medium. Thus, the first task in playing a sketch video is to unpack the incoming video data using the standard unpacking technique appropriate for the transmission medium. Next, the incoming data is split to separate the audio and video components of the video. This results in a compressed sketch image frame sequence and an associated audio component.

The sketch video image frames must be decompressed before they can be played. If the incoming video has been compressed, the first action in the decompression process is to convert any p-frames received into "full" sketch video frames based on their associated I-frame and previous p-frames using decompression procedure associated with the compression technique employed. Specifically, if the sketch video image frames were compressed using the previously described vectorization and compression process, they are decompressed as follows. For each image frame, the sketch image is reconstructed based on the spline and its associated control points that were used to respectively characterize the connected edge pixel patterns of the original image. Essentially, this entails using each set of control points and the spline employed to generate them, to identify a series of pixel locations in the reconstructed image frame. These pixel locations are designated as the edge pixels which define the sketch image frame and are assigned the color (e.g. black) that has been designated for such pixels in the reconstructed bi-level sketch image. The remaining non-edge pixels in each image frame are assigned the other bi-level color (e.g., white). It is noted that if a mixture of different spline types were employed to characterize the various edge pixel patterns in the sketch image frame being decompressed, then the incoming image data will include an indicator of the type of spline that was used to generated the corresponding control points for each characterized pattern. In such a case, the receiver will first identify the type of spline employed, then compute the edge pixels locations for the characterized pattern in the reconstructed sketch image frame. If a single spline type was used to characterize each edge pixel pattern in the image frame, then the just-described indicator method can be employed, or the receiver can simply be programmed to always employ the particular spline type associated with the incoming vectorized image frames.

The decompressed sketch video image frames can be rendered and displayed in sequence by the receiving device. This is accomplished using the standard rendering procedure appropriate for the receiving device.

Concurrently with the decompression of the sketch video image frame sequence, the audio components are also processed. This entails first decompressing the audio component of the sketch video. The audio decompression is accomplished using a method corresponding to the previously-described very low bit-rate audio compression method. Finally, the decompressed sketch video image frame sequence and the decompressed audio components are synchronized and played.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 16A shows the template used for I-frames, and FIG. 16B shows the two-frame template used for p-frames. The pixel to be coded is marked with '?' in the illustrations.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
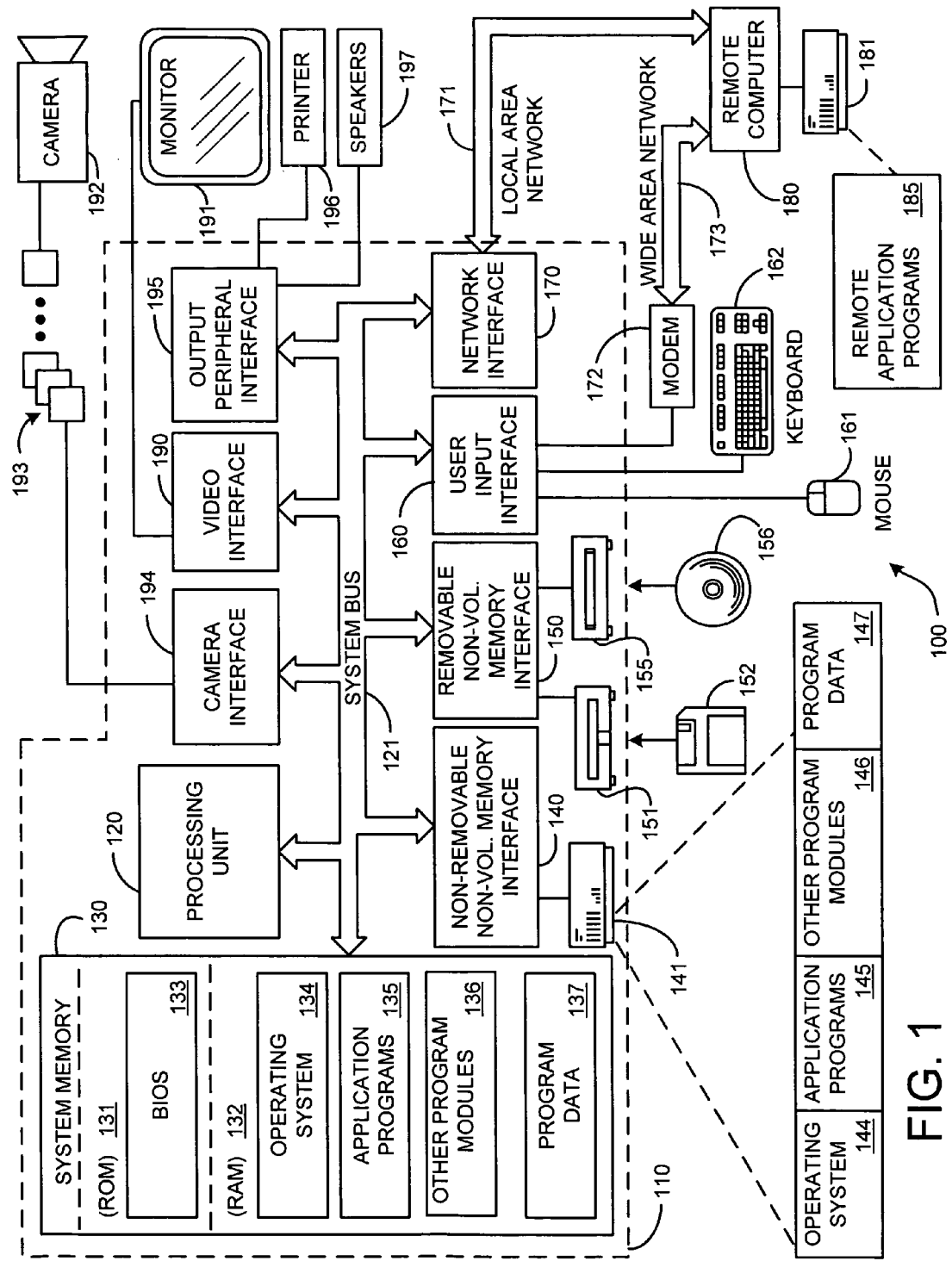
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the program modules embodying the invention. The system and process according to the present invention is related to the generation and playback of a bi-level video or sketch video in broadcast and communication systems. The techniques used to accomplish this task will now be described in the sections to follow. Specifically, the techniques for generating and playing bi-level video will be described in Section 1, while the techniques for generating and playing sketch video will be described in Section 2. Then, the use of the generated bi-level or sketch video in broadcast and communication systems will be described in Sections 3 and 4, respectively.

1. Generating and Playing Bi-Level Video

The process of generating video according to the present invention is preceded by obtaining or capturing an input video that will typically contain both audio and video components. The input video can be either a color video or a gray-scale video. In addition, the video could be initially captured with a digital video camera. In that case, the video can be input directly, via an appropriate interface, into a computing device that is to be used to encode it. Alternately, the video could be captured using a non-digital camera, and then digitized via conventional methods before being input into the computing device for encoding. In a video broadcast application, the video capture process could be either real-time or offline, while in a communication application, the video capture process must be real-time.

Figure 2:
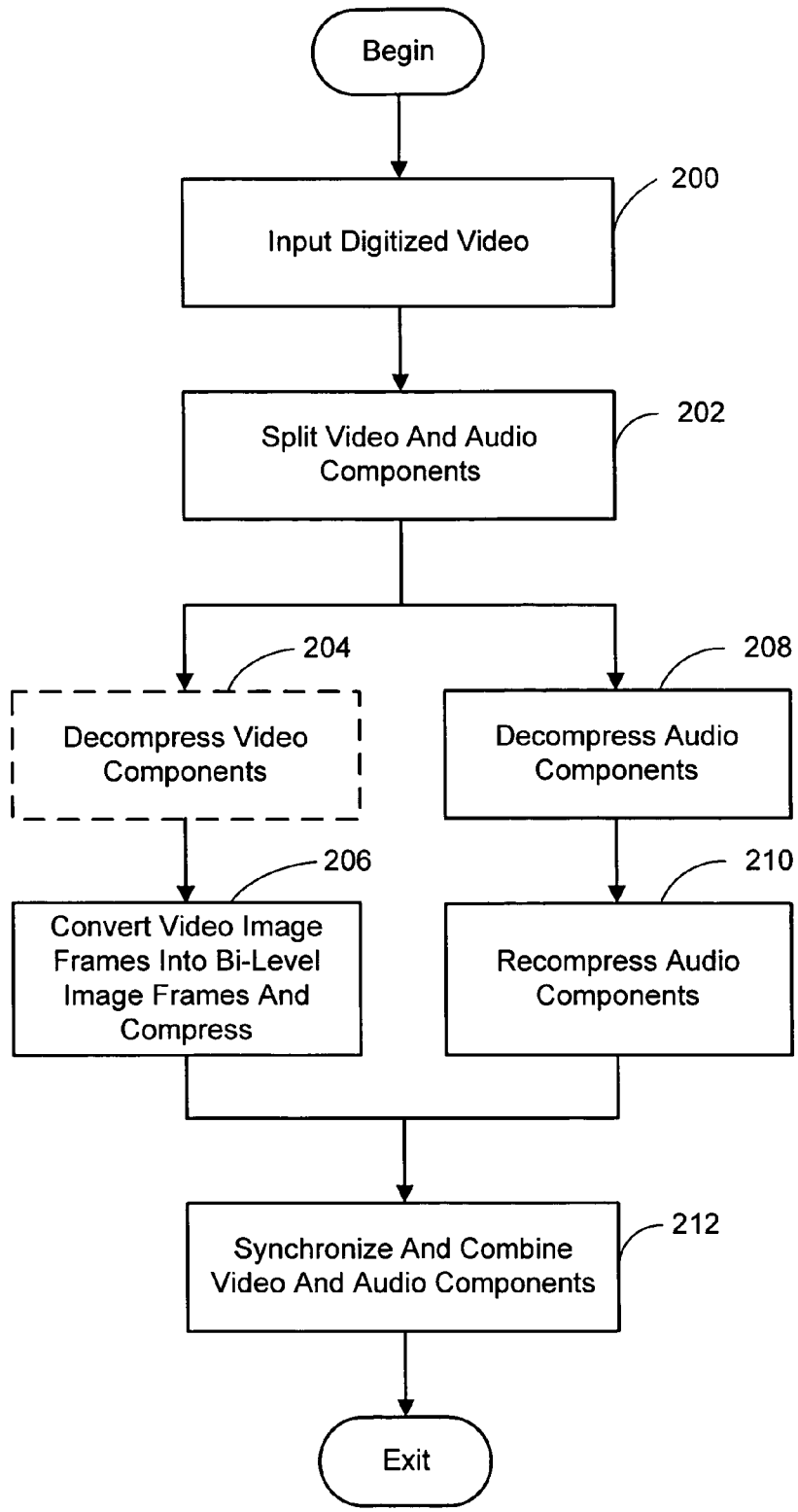
FIG. 2 is a flow chart diagramming an overall process for generating a bi-level video according with the present invention.

Referring to FIG. 2, the generating process begins by inputting the aforementioned digitized full-color or gray scale video (process action 200). The input video is then split into its audio and video portions (process action 202). The splitting can be accomplished using any conventional audio-video splitting method. Typically, the input video will have been compressed using some conventional video compression process. Thus, once split, the video portion of the frame, which constitutes image frames of the video, is decompressed if necessary (process action 204). Standard decompression techniques are employed for this task and will depend on the process used to initially compress the input video. It is noted that since this last action is performed only when the input video is compressed, it is an optional step.

Next, the input video image frames are converted into bi-level image frames and compressed (process action 206) using a new, very low bit-rate, bi-level video coding system and process, which will be described in detail in Section 1.1.

While the video component of the input video frame is being decompressed, and then recompressed, the audio component of the frame can be processed concurrently. The processing of the audio component of each input video frame entails decompressing the audio data if necessary using standard methods specific to the type of audio compression used to compress the data (process action 208). Preferably this decompression would also include a standard noise reduction procedure. The audio data is then recompressed (process action 210). In this case it is preferred that a very low bit-rate audio compression method be employed to minimize the amount of data that must be transmitted. Some currently available examples of this type of audio noise compression are the HP Mobile Voice, SIPRO ACELP.NET, FnG MPEG Layer 3, and Microsoft Corporation's Windows Media™ audio codec (version 2) methods.

After the video part of bi-level video has been generated and compressed, and the audio data has been compressed, the audio and video components are synchronized and combined to produce a complete bi-level video, as indicated by process action 212. Any appropriate existing AVI multiplexing technique can be used for this purpose, such as AVI Mux in Microsoft DirectMedia 6.0. The completed bi-level video can be in the form of a video file or can take the form of a bit stream. The video file can be used in a broadcast application where the broadcast of the video is to take place sometime after its generation. The bit stream from of the video could be used for an immediate broadcast application, or for a video communications application. It is noted that in the case of the bit stream, the bi-level generation process can be viewed as a sequential process with the foregoing actions being performed on each frame or a group of frames of the input video. As portions of the overall bi-level video are generated, they are transmitted thus creating the aforementioned bit stream.

In order to transmit the bi-level video over a network to a receiving device, either from a previously generated file or as a real time bit stream, the video data will typically have to be prepared first using a packetizing technique applicable to the transmission method. For example, if the bi-level video is to be transmitted over the Internet, the data would be packetized via Internet protocols.

1.1. Very Low Bit-Rate Bi-Level Video Coding

Figure 3:
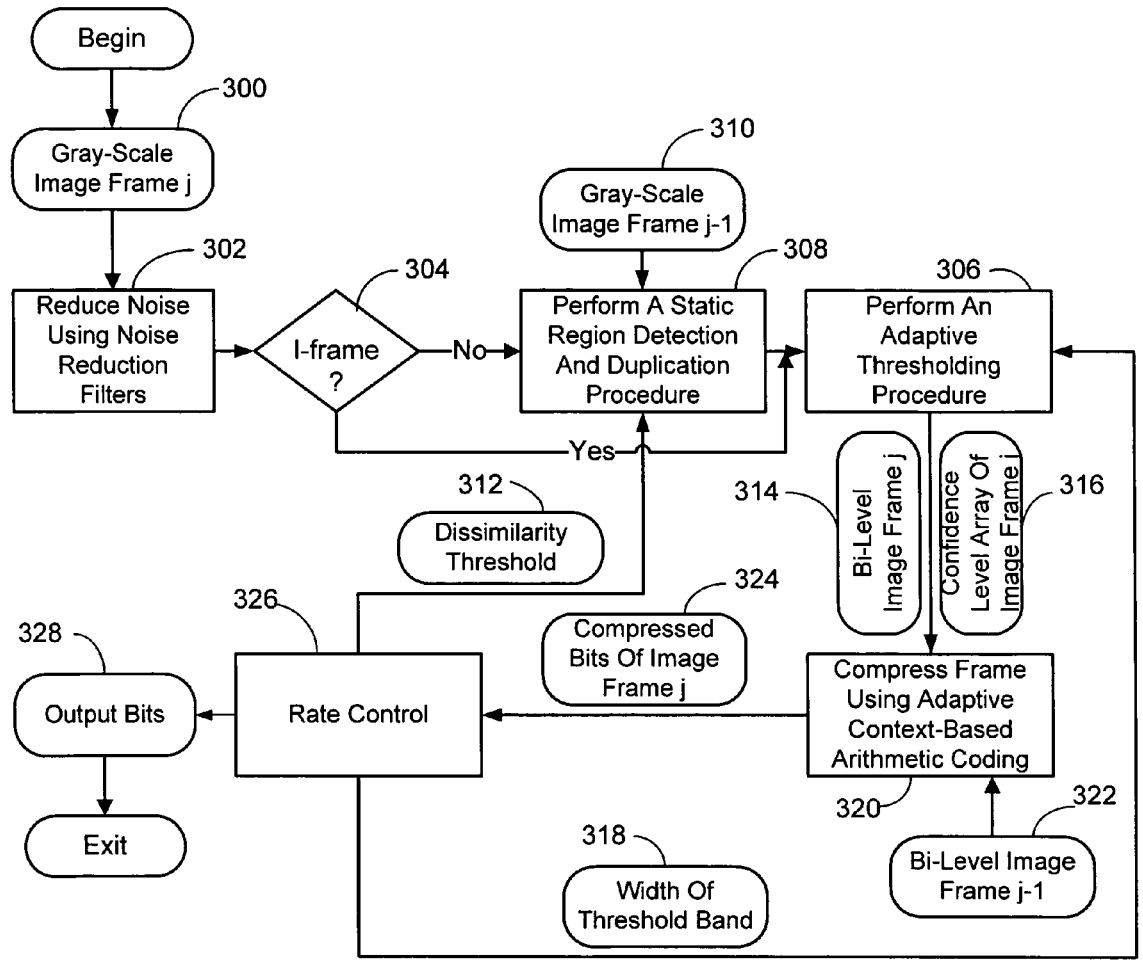
FIG. 3 is a flow chart diagramming a process that implements the very low bit-rate bi-level video coding technique of FIG. 2.

In general, referring to FIG. 3, the image frame portion of the bi-level video is generated as follows. If the input video is a full color video, each frame is converted to a gray scale frame using conventional methods. The gray scale frames are then input in sequence to the present conversion process, as indicated by process action 300. Next, the incoming gray scale image frames are put through a group of conventional noise reduction filters (process action 302) to reduce noise. It is then determined whether the frame under consideration is an intra-frame (i.e., I-frame) or an inter-frame (i.e., p-frame), as indicated by process action 304. If the frame is an I-frame, it is processed directly using an adaptive thresholding procedure (process action 306). Otherwise (i.e., the frame is a p-frame), it is compared with its immediately preceding frame using the static region detection and duplication procedure (process action 308). As will be discussed in greater detail later, the static region detection and duplication procedure entails inputting the gray scale image frame (j−1) preceding the p-frame under consideration as indicated by process action 310. In addition, a dissimilarity threshold is input as indicated by process action 312. This dissimilarity threshold defines at what point the difference between a pixel in the p-frame under consideration and the correspondingly-located pixel in the preceding gray scale image frame is considered drastic enough to indicate a change due to movement between the frames. For image regions that are within a dissimilarity threshold, each pixel is duplicated from its corresponding pixel in the preceding frame, and for pixels of the p-frame under consideration that are greater than the threshold, the pixel values remain unchanged. Once this process is complete the modified p-frame undergoes the aforementioned adaptive thresholding procedure (process action 306). The adaptive thresholding procedure is used to calculate a suitable threshold for each image frame. This threshold is employed to compute both a bi-level image frame and a two-dimensional confidence level array from each gray scale image frame, which are then output as indicated by process actions 314 and 316. The confidence level array is made up of confidence level values assigned to each pixel location of the frame that are indicative of how likely each pixel is to be the color indicated by the threshold. The confidence level of each bi-level pixel can be simply measured by the difference between the gray-scale value of a pixel and the threshold. If the difference falls outside a threshold band around the computed threshold value for the frame under consideration, then the confidence level is high and a first binary reliability value is preferably assigned to the pixel location. The width of the threshold band is inputted for this purpose from a rate control procedure, as indicated by process action 318. If, however, the aforementioned difference falls within the threshold band, the confidence level is lower and a second binary reliability value is preferably assigned to the pixel location. After that, each frame is compressed by an adaptive context-based arithmetic coding technique (process action 320). As will be discussed later, if the frame is an I-frame, it is coded with an intra-frame template, otherwise it is coded with an inter-frame template constructed with respect to pixels in the previous frame. To this end, the bi-level image frame computed for the frame preceding the frame under consideration is input as indicated by process action 322. For pixels with their confidence levels within the threshold band, their bi-level values are modified according to the prediction of the context-based arithmetic encoding. The result of the adaptive context-based arithmetic coding technique is a series of bits representing a compressed bi-level image frame, as indicated by process action 324. A rate control procedure that employs factor adjustment and frame dropping can be used to limit the bit rate of the compressed video data output to within a given bandwidth (process action 326), as will be discussed later. As a result, when the present coding process operates at very low bandwidths, what is reserved in high priority is the outline features of the objects. This satisfies the needs in certain applications as discussed previously. The factors adjusted include the dissimilarity threshold mentioned previously, which is output for use in the static region detection and duplication procedure, and the width of a threshold band, which is output and used in the aforementioned adaptive thresholding procedure. Finally, the bit stream representing the compressed bi-level video frames is output as indicated by process action 328. The process modules responsible for accomplishing each of the foregoing actions will now be described in more detail in the sections to follow.

1.1.1 Static Region Detection and Duplication

Flickering effect usually occurs when a scene is illuminated in an unstable lighting condition and can be quite evident after a gray-level image sequence is converted to a bi-level image sequence. The reason for this is that some correspondingly-located pixels in earlier frames of the video will have different pixel values than later frames because the lighting conditions have changed, even though there has been no movement and the pixels are depicting the same thing. In other words, when a thresholding technique is used to determine which pixels are to be what color in the bi-level video, it is possible that a pair of the aforementioned correspondingly-located pixels between two frames could be assigned a different color, despite the fact that nothing has changed but the lighting. As a result, when the bi-level video is played these pixels will appear to flicker. However, the flickering effect can be substantially eliminated. This reduction of flickering effect can also effectively raise the compression ratio in the subsequent adaptive context-based arithmetic coding to be discussed shortly. This is because less data is needed to characterize the frames of the bi-level video if the pixel values change less frequently.

Figure 4:
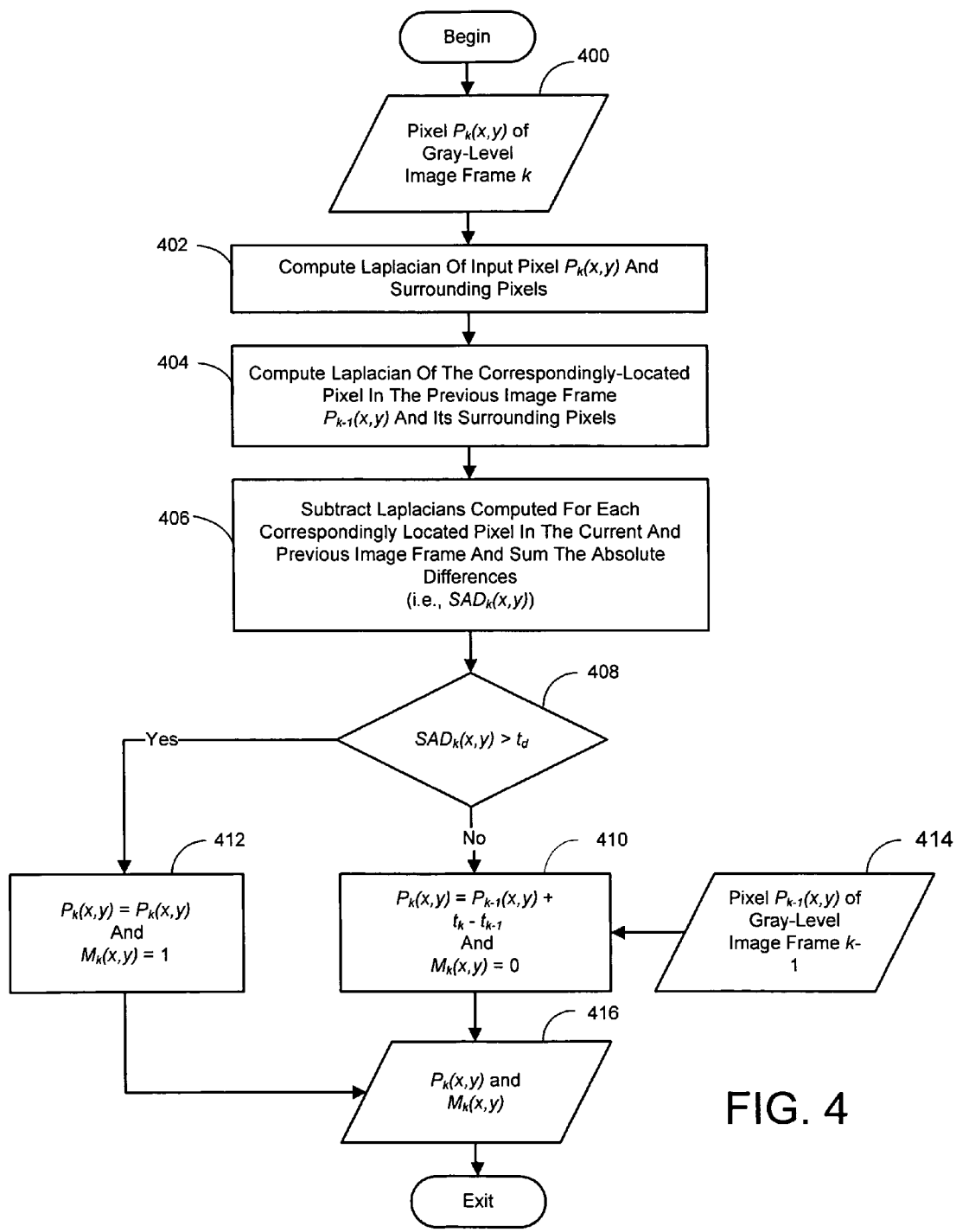
FIG. 4 is a flow chart diagramming a process that implements the static region detection and duplication technique of FIG. 3.

Any method that can determine the similarity of two consecutive frames and separate real motion from flickering can be used to identify the problematic pixel locations. However, in tested embodiments of the present invention the process outlined in FIG. 4 was employed. Essentially, this process involves using a Laplacian of an image as its reference. The Laplacian of a pixel is the second derivative of intensity at that pixel. It represents the relative intensity between the pixel and its neighbors. The advantage of using the second derivative over the first derivative is that it not only eliminates the effect of uniformly-added background intensity, but also eliminates the effect of uniformly-multiplied illumination intensity. Therefore, if the Laplacian of a region remains unchanged, the region is most likely static. Specifically, the gray scale value of a pixel of the input video frame under consideration (i.e., $P_k(x,y)$) is input as indicated by process action 400, beginning with the second frame of the video sequence. The pixel values of the first frame are not changed in this process. The Laplacian of a pixel is equal to 8 times the gray-level value of the pixel minus all the gray-level values of its eight neighbor pixels, i.e.

$$L(x,y)=8\times G(x,y)-G(x-1,y-1)-G(x,y-1)-G(x+1,y-1)-G(x-1,y)-G(x+1,y)-G(x-1,y+1)-G(x,y+1)-G(x+1,y+1) \quad (1)$$

The variation of the gray-level value of a pixel between two consecutive frames can be categorized into two parts. The first part is due to the real motion of objects, and the second part is caused by lighting variation that results in the instability of bi-level image sequence. In conditions where there are lighting variations, although the gray-level value of a pixel is changed between two consecutive frames, the relative difference of its value with its neighbor pixels remained unchanged. Thus, by judging the difference of the Laplacians of corresponding pixels in two consecutive frames, it is possible to differentiate between regions associated with real motion and those caused by lighting variation, i.e., $$\Delta L_k(x,y)=L_k(x,y)-L_{k-1}(x,y), \quad (2)$$

where k indicates the frame number. Once the difference of the Laplacians of a pair of corresponding pixels in a frame under consideration and its preceding frame has been computed, a threshold could be used to identify if the difference in the Laplacians amounts to a dissimilarity indicative of inter-frame movement or one merely indicative of a changing lighting condition. However, to prevent imaging noise from causing a false determination, additional processing can be employed to ensure a more accurate outcome. Specifically, the sum of the absolute differences of the Laplacians of corresponding pixels in two consecutive frames in a square surrounding the target pixel is computed. In other words, referring again to FIG. 4, a Laplacian is computed for the target pixel $P_k(x,y)$ and the other pixels in a prescribed square in a frame of the input video under consideration (process action 402). Similarly, a Laplacian is computed for the pixel in the previous frame corresponding in location to the target pixel, as well as the pixels in that frame corresponding in location to the pixels in the aforementioned square (process action 404). Then, in process action 406, the Laplacians computed for each corresponding pixel between the frames are subtracted from each other and the absolute value of the difference for each pixel location is summed. These summed differences are designated as the SAD of the target pixel, i.e., $SAD_k(x, y)$. Preferably, nine pixels are chosen as the length of the square (which would thus contain 81 pixels), with the target pixel being centered in the block. However, other configurations may also be employed as desired.

Next, as indicated in process action 408, it is determined if the SAD of the target pixel is greater than a prescribed dissimilarity threshold $t_d$, i.e., $$SAD_k(x,y)>t_d, \quad (3)$$

Preferably, $t_d$ is set between approximately 1.0 and 3.0, although other ranges could also be employed. If the SAD is greater than the dissimilarity threshold, then the target pixel is marked as dissimilar to the corresponding pixel in the previous frame. This is done as indicted in process action 410 by setting a mask value to 1 (i.e., $M_k(x,y)=1$) and associating it with the pixel. In addition, the pixel value of the target pixel $P_k(x,y)$ as input is retained (at least initially), as indicated in process action 416. The value is retained because the change in the pixel is more likely due to movement and not variations in the lighting conditions. It is noted that the significance of the mask value will be discussed shortly in association with an optional noise reduction procedure.

If, however, the SAD is determined not to be greater than the dissimilarity threshold, then the target pixel is marked as similar to the corresponding pixel in the previous frame. This is done as indicted in process action 412 by setting a mask value to 0 (i.e., $M_k(x,y)=0$) and associating it with the target pixel. Additionally, as indicated in process action 412, the gray-level value is copied from the corresponding pixel in the previous frame and assigned to the target pixel location in lieu of the actual value. Accordingly, the pixel value of the corresponding pixel (i.e., $P_{k-1}(x,y)$) is input as indicated by process action 414. In addition, the imported value is compensated by the difference of thresholds of two consecutive frames, i.e., $t_k-t_{k-1}$ so that the bi-level value of the pixel will be the same as those of previous frame after being determined by the threshold $t_k$ (process action 412). This procedure compensates for the lighting variation effect on the background. Since the threshold $t_k$ is determined according to the gray-level distribution of current frame, the light variation effect on the foreground is also compensated. The pixel value and mask value assigned to the target pixel are then output (process action 416). The foregoing process is repeated for each pixel in the frame under consideration.

It is noted that in the foregoing static region detection and duplication technique, the pixel values assigned to each consecutive frame are used in the analysis of each future frame rather than their initial values, with the exception of the first frame or an I-frame in the video sequence since its values are never changed.

If it is known that the scene depicted in the video is of the upper body of a person, after all the pixels are marked, the two outermost pixels in each row that have been marked as dissimilar are identified, if they exist. Then, pixels of the row that are between these two outlying pixels are also marked as dissimilar, if they have not already be so marked. This option simply entails flipping the mask value from a 0 to 1, and then reassigned its original gray scale value.

The mask values of the pixels in preceding frames can also be considered in an attempt to reduce noise, if desired. For example, to prevent residue from previous copying, if a pixel is marked as dissimilar in a frame, the correspondingly-located pixel in a prescribed number (e.g., 3) of future frames sequentially following that frame are also marked as dissimilar. This is accomplished by determining for each pixel in a frame under consideration that has been marked as similar (i.e., $M_k(x,y)=0$), whether less than a prescribed number of its corresponding-located pixels in frames sequentially preceding the frame under consideration are each marked as dissimilar. If so, then the pixel in the frame under consideration is marked as dissimilar as well (i.e., $M_k(x,y)$ is changed to 1), and reassigned its original gray scale value. As an example, suppose it is desired to mark the correspondingly-located pixels of three future frames in the sequence as dissimilar whenever a pixel is marked as dissimilar in a frame. In such a case, a pixel marked as similar in a frame currently under consideration would be changed to dissimilar only if three or less of the correspondingly-located pixels in the frames immediately preceding this frame in the sequence are marked as dissimilar. If, however, any more than three of the correspondingly-located pixels in the frames immediately preceding the frame under consideration in the sequence are marked as dissimilar, then the marked value (i.e., $M_k(x,y)=0$) would not be changed. In addition, to further reduce noise, each region of dissimilarity in each frame can optionally be expanded outwards by one pixel. This entails identifying the regions of pixels marked as dissimilar in the frame currently under consideration via conventional methods, and then changing the marked value of the pixels immediately adjacent each region from similar (i.e., $M_k(x,y)=0$) to dissimilar (i.e., $M_k(x,y)=1$). In addition, the original gray scale values are reassigned to these pixels.

Finally, the minimum-sized rectangle that will surround all regions of dissimilarity in each frame under consideration is identified as a bounding box for that frame. The offset of one of the box's corner, and its width and height are recorded. This bounding box information will be employed later in the compression phase of the present bi-level coding process.

1.1.2 Adaptive Thresholding

The pixels of each frame of the input video must be converted to one or the other of the two bi-level colors. For example, if the bi-level colors are to be black and white, then the gray-scale pixels values of each pixel of each frame of the input video are designated as either black or white. One way of accomplishing this task is to establish a threshold gray-scale value. All the pixel values falling above the threshold would be designated as white, and all the pixels falling below the threshold value would be designated as black. However, this threshold is preferably selected according to the circumstances of the target image. As the frames of the input video can depict anything, it is advantageous to determine the threshold adaptively for each frame, rather than prescribing a single threshold value. Selecting the threshold value adaptively based on the circumstances of each frame ensures that the features of the scene captured in the resulting bi-level video can be clearly observed. Any conventional method for adaptively selecting a threshold value for each frame can be employed. For example, in tested embodiments of the present invention, the Ridler's Iterative Selection method [5] was employed. The Iterative Selection technique involves making an initial guess at a threshold, and then refining it by consecutive passes through the frame. In other words, it thresholds the image into object and background classes repeatedly, using the levels in each class to improve the threshold. Specifically, the initial guess at the threshold $t_a$ is simply the mean gray level of all the pixels in the frame under consideration. This threshold is then used to collect statistics on the black and white regions obtained. Namely, the mean gray level $t_b$ for all pixels below the initial threshold is computed, as is the mean level $t_o$ of the pixels greater than or equal to the initial threshold. Next, a new estimate of the threshold is computed as $t_a=(t_b+t_o)/2$, or the average of the mean levels in each pixel class, and the process is repeated using this threshold. When no change in threshold is found in two consecutive passes through the image, the process stops, and the last computed threshold $t_a$ is designated as the selected threshold for the frame under consideration.

There may, however, be some input videos for which an automatic thresholding method (such as the one described above) will not produce the optimal thresholds that result in the best visual quality for the bi-level video. One way of addressing this problem is to allow user to adjust the threshold manually. For example, as each frame of the input video is converted to a bi-level video frame, it could be rendered and played back to the user. The user would have some sort of interface to adjust the automatically computed threshold. For instance, a graphical user interface such as the currently popular slider could be rendered onto the user's display adjacent to the region where the playback of the newly created bi-level video frames are being shown. The user employs a cursor displayed on the display screen to "slide" a knob on the linear slider in one direction or the other to adjust the threshold. As the threshold is changed, the impact is seen in the bi-level video being played back to the user on his or her display screen. The user can adjust the threshold further as desired to optimize the clarity of the resulting bi-level video. The threshold could theoretically vary anywhere from a gray scale value of 0 up to a value of 255. Therefore, the user could theoretically adjust the threshold up from the current value to an upper limit of 255, or down from the current value to a lower limit of 0. Preferably, the user interface employed would indicate the current threshold level. For example, in the case of the slider, the knob would appear along the slide at a point proportional to the current threshold level, where one end of the slider represent the 0 level and the other end represents the 255 level. Mathematically, the final threshold for a frame under consideration would be $t=t_a+t_c$, where $t_c$ denotes the threshold compensation interjected by the user.

1.1.3 Threshold Band

Figure 5:
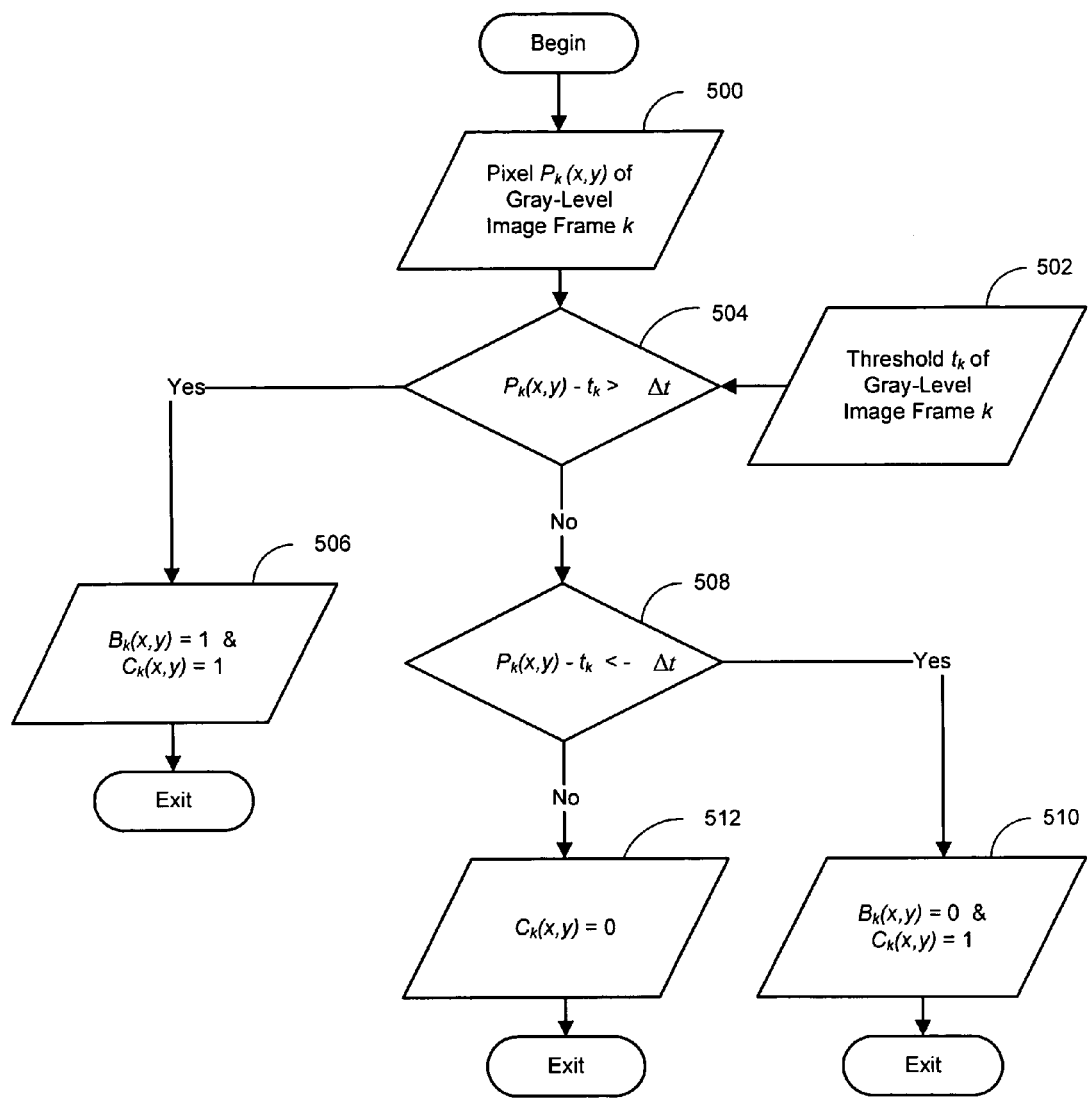
FIG. 5 is a flow chart diagramming a process that implements the threshold band technique of FIG. 3.

While the decision as to whether a pixel in a gray-level image frame is converted to one or the other of the bi-level colors can be determined by the single threshold value t described above, it can be advantageous to employ a threshold band instead. Specifically, a threshold band of $2\Delta t$ can be established. This threshold band represents a region around the selected threshold for a frame of the input video in which the decision as to whether the pixel should be designated as one of the other of the bi-level colors is a close call. Outside the threshold band the decision is clear cut. It has been found that a value of $\Delta t$ within a range of 0 to 5 gray scale levels sufficiently characterizes the so-called close call region, however other ranges may also be employed as desired. The threshold band option is implemented by processing each pixel of each frame of the input video as outlined in FIG. 5. Specifically, the gray scale value of a pixel of the input video frame under consideration (i.e., $P_k(x,y)$) is input as indicated by process action 500. In addition, the threshold value $t_k$ currently assigned to the frame under consideration is input as indicated by process action 502. This threshold value $t_k$ is the sum of the automatically computed threshold $t_a$ and any user input compensation $t_c$, as described previously. It is first determined whether the gray-level value of the pixel $P_k(x,y)$ less the threshold value $t_k$ is greater than the prescribed $\Delta t$ value (process action 504). If it is, the bi-level value ($B_k(x,y)$) of the pixel is designated to be the lighter of the two bi-level colors (e.g., white) by assigning a first binary value to the pixel (e.g., preferably a "1"). In addition, a confidence level ($C_k(x,y)$) indicating that the pixel is not within the aforementioned threshold band is assigned to the pixel. Preferably, this confidence level can be a binary value, specifically a "1". These values (i.e., $B_k(x,y)=1$ and $C_k(x,y)=1$) are output, as indicated by process action 506. If, however, it is determined the aforementioned difference is not greater than the prescribed $\Delta t$ value, then it is determined whether the gray-level value of the pixel $P_k(x,y)$ minus the threshold value $t_k$ is less than a value of $-\Delta t$ (process action 508). If it is less, then the bi-level value ($B_k(x,y)$) of the pixel is designated to be the darker of the two bi-level colors (e.g., black) by assigning a second binary value to the pixel (e.g., preferably a "0"). In addition, the aforementioned confidence level indicating that the pixel is not within the aforementioned threshold band is assigned to the pixel (i.e., $C_k(x,y)=1$). These values (i.e., $B_k(x,y)=0$ and $C_k(x,y)=1$) are output, as indicated by process action 510. If, however, the aforementioned difference shows that the gray scale value of the pixel under consideration is not less than negative Δt, this indicates that the pixel falls within the prescribed threshold band of 2Δt. In such a case, a bi-level pixel value is not immediately assigned to the pixel. Instead, the pixel value will be set to whatever value is predicted for the pixel under consideration in a subsequent arithmetic coding process to be discussed next. In order to indicate that the pixel is to be assigned the predicted value, a confidence level having a binary value opposite that assigned to the pixels falling outside the threshold band is assigned to the pixel under consideration (i.e., $C_k(x,y)=0$) and output as indicated by process action 512.

1.1.4 Adaptive Context-Based Arithmetic Coding

A modified adaptive context-based arithmetic encoding scheme is used to compress the bi-level image sequences. Similar to MPEG4 shape coding [10], prior to coding the first pixel, the arithmetic encoder is initialized. Each binary pixel is then encoded in raster order. The process for encoding a given pixel generally entails first computing a context number, then indexing a probability table using the context number. Finally, the indexed probability is used to drive an arithmetic encoder. When the final pixel has been processed, the arithmetic code is terminated.

Figures 16A, 16B:
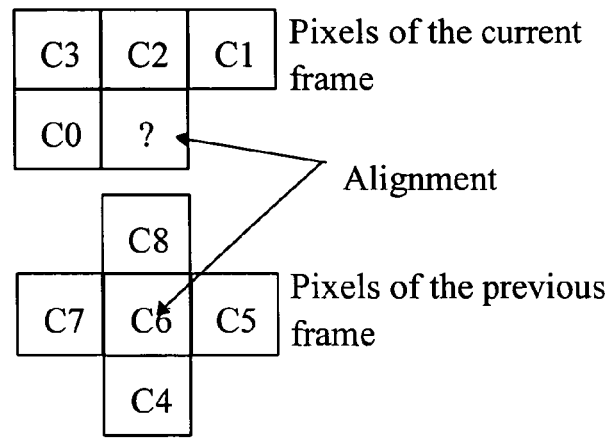
FIGS. 16A and 16B illustrate the context templates employed in the adaptive context-based arithmetic coding technique according to the present invention.

In general, the same template and context construction scheme as those in MPEG4 [10] are applied. For intra coded frames, a 10-bit context is built for each pixel as illustrated in FIG. 16A. For inter coded frames, temporal redundancy is exploited by using pixels from the previous frame to make up part of the context. Specifically, a 9-bit context is built as illustrated in FIG. 16B.

One difference of the present adaptive context-based arithmetic encoding process compared to MPEG4 Shape Coding is that the present process codes the whole frame rather than lots of blocks and the probability table is adaptively constructed during encoding. In other words, an adaptive arithmetic coder is used rather than an arithmetic coder with a fixed probability table. The reason is that an adaptive arithmetic coder is more stable and more flexible so as to better handle working with different kinds of video scenes. Unlike binary alpha planes in MPEG4 Shape Coding, which are usually simple and well-regulated, bi-level videos may include many scenarios, from low-motion videos to high-motion videos, from cartoon clips to real scene clips, etc. So it is hard to train a general probability table for all these scenes. On the other hand, using an adaptive arithmetic coder makes the block-based coding method adopted in MPEG4 Shape Coding inefficient since it is impossible for an adaptive method to converge in such a short block length.

In the present method, the initial probability of each context number could be quoted from a pre-trained table or be all set equal to ½. The latter is called a "½" table. A pre-trained table can be generated from conventional bi-level video clips or previous frames in the same image sequence. In either case, statistical results are incorporated into the probability table during encoding. This is why the present encoding scheme is called "adaptive encoding". If computational power permits, both initial tables can be used and the one that produces the fewest bits is selected. Tests show that usually a pre-trained table is better than a "½" table as an initial table. It is noted that an indicator is included in the bit stream to indicate to the decoder which type of probability table was employed to encode each frame so that the same table can be used in the decoding process.

Certain frames are also preferably designated as intra-frames (i.e., I-frames), while a series of frames following each I-frame in the bi-level video sequence are designated as inter-frames (i.e., p-frames). All the pixels of an I-frame are encoded, whereas only those pixels found within the previously defined bounding box are coded for a p-frame. The pixels in the p-frames outside the bounding box are deemed to be the same as the last-preceding frame. Specifically, the first frame of the bi-level video is designated as an I-frame, and then a prescribed number of frames following the first in sequence are designated as p-frames. This is followed by designating the next consecutive frame as an I-frame and repeating the process as the bi-level frames are generated. The number of p-frames between I-frames is preferably chosen so as to minimize problems associated with unicasting or multicasting log-on delays, jumpy transitions and transmission error propagation. In tested embodiments of the present invention, it was found that limiting the number of p-frames existing between I-frames to 3-5 seconds times the frame rate of input video produced acceptable results. It is noted that the location and size of the bounding box in the overall bi-level image frame of a p-frame are added to the bit stream data associated with that p-frame. This is so the receiver can reconstruct the entire bi-level frame from just the encoded data by assuming the pixels outside the bounding box are the same as the correspondingly located pixels in the last frame preceding the p-frame under consideration.

In regard to the use of I-frames and p-frames, each frame can be compressed with the aforementioned adaptive context-based arithmetic encoding scheme in the intra or inter mode. Both modes result in the generation of a single binary arithmetic codeword. The various coding modes are characterized by their context computation and the probability table used. However, for inter mode, only pixels within the bounding box are encoded. When building contexts, any pixels outside the limits of an I-frame that are to the left, right and above are assumed to be zero. Finally, in addition to the pre-trained table and the "½" table, p-frames can also be treated as I-frames and encoded using an I-frame table provided that such a table result in the minimum bits being produced.

Figure 6:
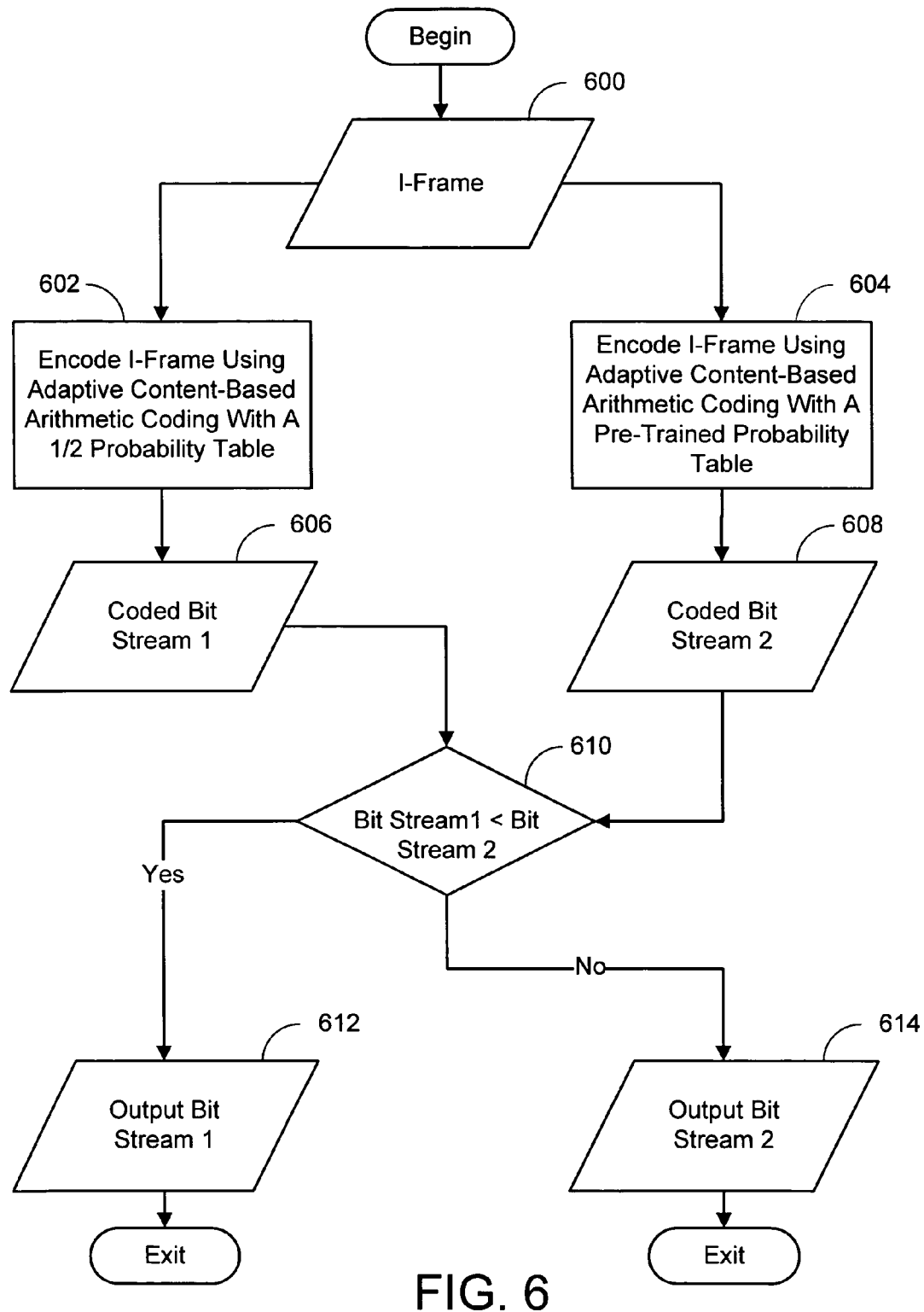
FIG. 6 is a flow chart diagramming a process that implements the adaptive context-based arithmetic coding technique of FIG. 3 for I-frames.

Thus, referring to FIG. 6, a bi-level video I-frame generated via the process described previously, is preferably encoded and compressed as follows. First, a bi-level video frame that has been designated as an I-frame is input into two arithmetic coding modules, as indicated by process action 600. The first arithmetic coding module adaptively encodes the I-frame using a so-called ½ probability table as an initial probability table (process action 602), whereas, the second arithmetic coding module adaptively encodes the I-frame using a pre-trained probability table as an initial probability table (process action 604). Both of the modules use an intra-frame template as shown in FIG. 16A. This produces two separate coded bit streams representing the I-frame as indicated by process actions 606 and 608. In process action 610, it is determined which of the two coded bit streams exhibits the lowest bit rate. If the bit stream produced using the ½ probability table exhibits the lowest rate, it is output as indicated by process action 612. Otherwise, the bit stream produced using the pre-trained probability table is output (process action 614).

Figure 7:
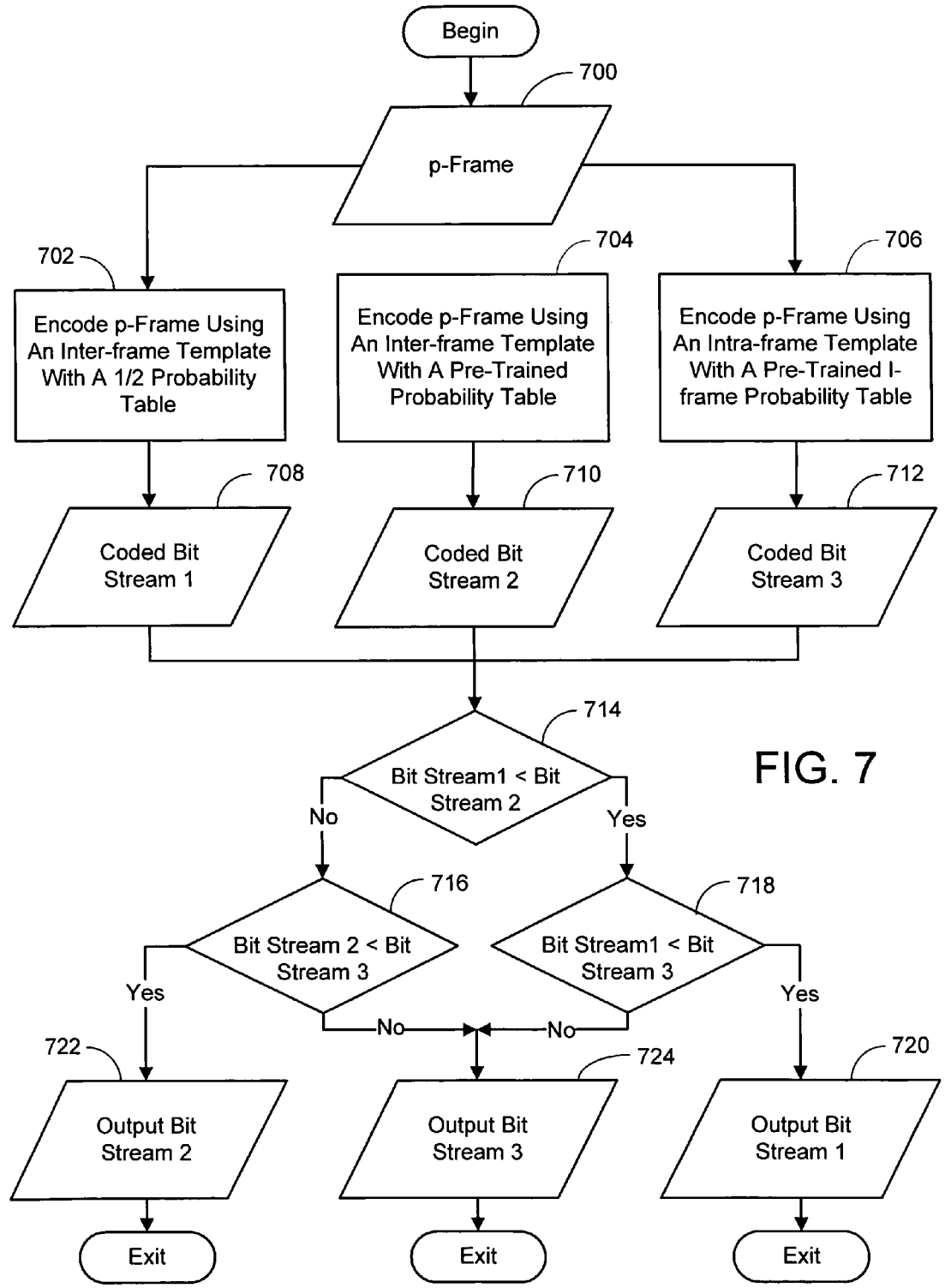
FIG. 7 is a flow chart diagramming a process that implements one embodiment of the adaptive context-based arithmetic coding technique of FIG. 3 for p-frames.

As indicated previously, p-frames are handled differently. Specifically, only the pixels inside the previously-defined bounding box is coded and usually an inter-frame template as shown in FIG. 16B is used. However, a p-frame can also be coded as an I-frame using an intra-frame template. Accordingly, while just a ½ table and pre-trained table together with an inter-frame template could be employed to encode each p-frame, it is also possible to additionally encode a p-frame using an I-frame table together with an intra-frame template. Specifically, referring to FIG. 7, a bi-level video frame produced via the process described previously and designated as a p-frame, is preferably encoded and compressed as follows.

First, the p-frame is input into three arithmetic coding modules, as indicated by process action 700. The first arithmetic coding module adaptively encodes the p-frame using an inter-frame template with a ½ probability table as an initial probability table (process action 702). The second arithmetic coding module adaptively encodes the p-frame using an inter-frame template with a pre-trained probability table as an initial probability table (process action 704). And finally, the third arithmetic coding module adaptively encodes the p-frame as an I-frame using an intra-frame template with a pre-trained I-frame probability table employed to encode the last I-frame preceding the p-frame under consideration (process action 706). It is noted that FIG. 7 only shows one arithmetic coding module employing an I-frame probability table. However, there could be more. For example, an additional arithmetic coding module employing the final version of the probability table resulting from adaptively encoding the I-frame could be included or used in lieu of the I-frame's initial pre-trained table. As for the configuration depicted in FIG. 7, the encoding actions produce three separate coded bit streams representing the p-frame as indicated by process actions 708, 710 and 712. In process actions 714, 716 and 718, it is determined which of the three coded bit streams exhibits the lowest bit rate. If the bit stream produced using the ½ probability table exhibits the lowest rate, it is output as indicated by process action 720. If the bit stream produced using the pre-trained p-frame probability table exhibits the lowest rate, it is output as indicated by process action 722. Otherwise, the bit stream produced using the pre-trained I-frame probability table is output (process action 724).

1.1.5 Rate Control

A rate control mechanism can optionally be implemented in the present bi-level video coding process, as well. Essentially, this rate control involves adaptively adjusting the width of the aforementioned threshold band and the dissimilarity threshold. The wider the threshold band is, the more pixels that are coded according to the context-based arithmetic probability, and therefore the lower the bit rate exhibited by the generated bit stream. Similarly, the higher the dissimilarity threshold is, the more pixels that are viewed as being similar to corresponding pixels in previous frame, and therefore the lower the bit rate exhibited by the generated bit stream. While any appropriate method for adjusting the threshold band and the dissimilarity threshold can be employed, a simple rate control scale factor table is preferably used to provide the desired adaptive rate control adjustment. Table 1 provides an example of such a table.

TABLE 1

| Rate control scale factor f | Dissimilarity threshold $t_d$ | Half-width of threshold band $\Delta t$ |
| --- | --- | --- |
| 9 | 3.0 | 5 |
| 8 | 3.0 | 4 |
| 7 | 2.5 | 4 |
| 6 | 2.5 | 3 |
| 5 | 2.0 | 3 |
| 4 | 2.0 | 2 |
| 3 | 1.5 | 2 |
| 2 | 1.5 | 1 |
| 1 | 1.0 | 1 |
| 0 | 1.0 | 0 |

Figure 8A:
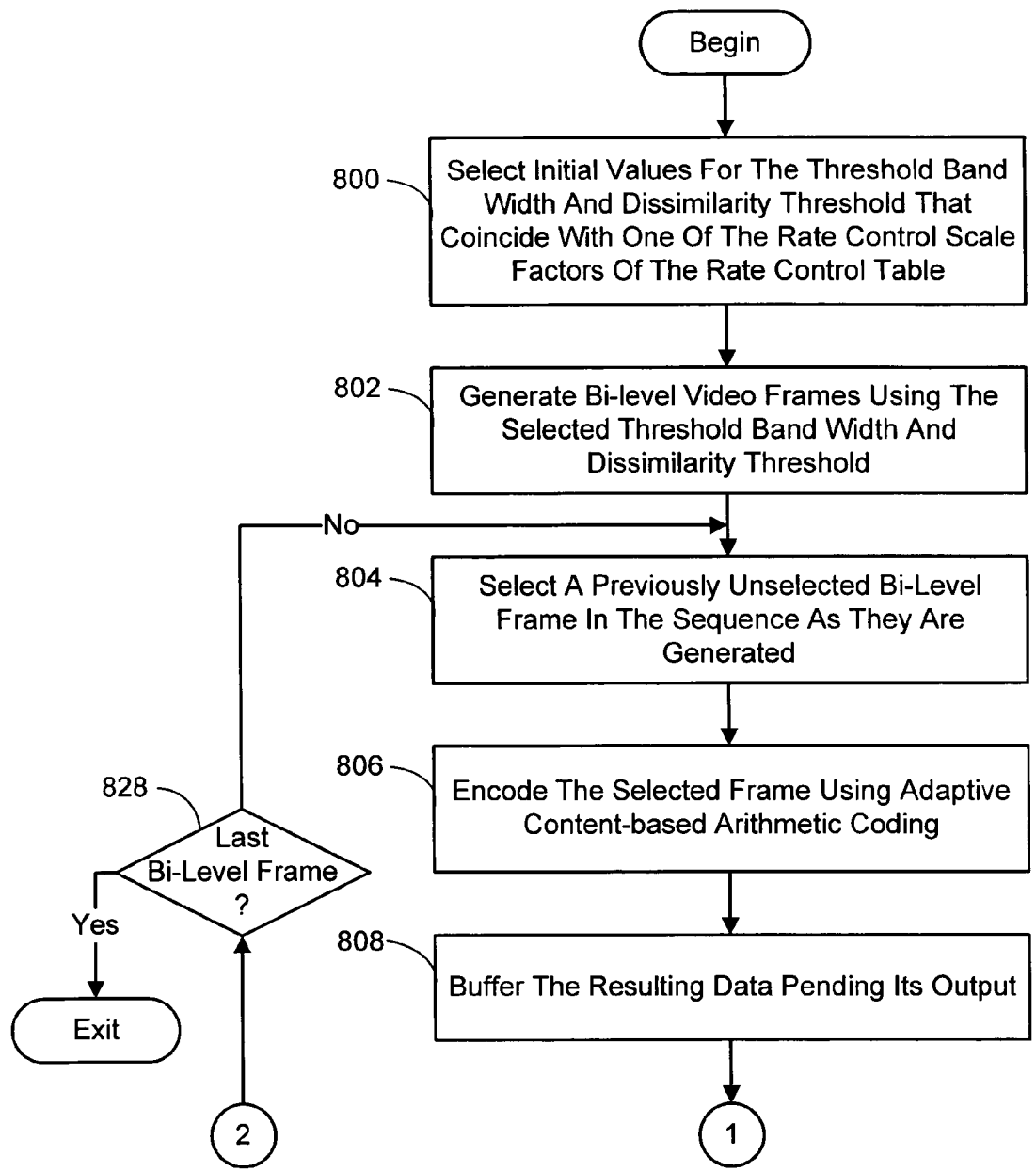
FIGS. 8A and 8B depict a flow chart diagramming a process that implements an optional rate control technique of FIG. 3.
Figure 8B:
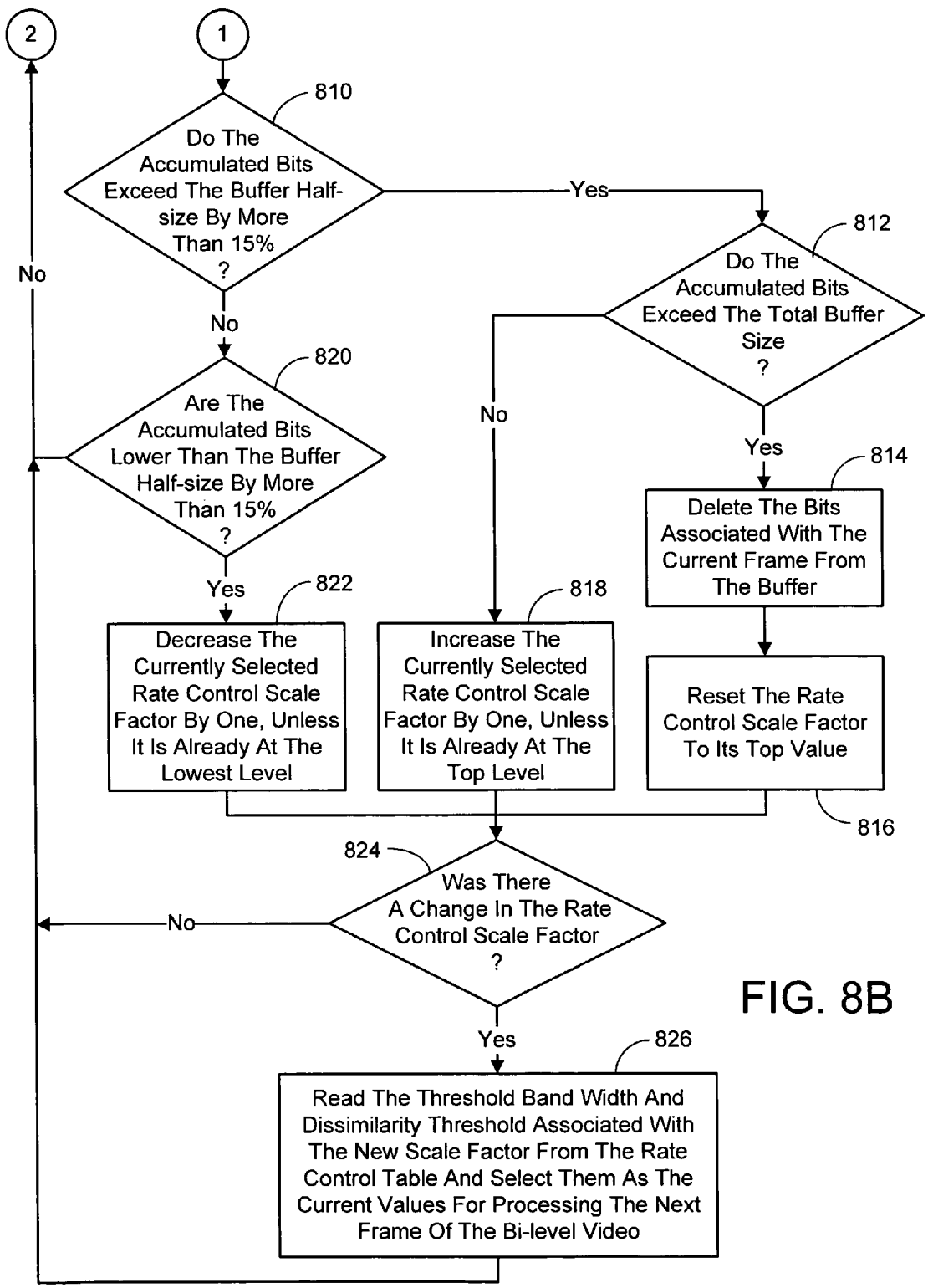

Generally, referring to FIGS. 8A-B, the initial values for the width of threshold band and the dissimilarity threshold are selected to coincide with one of the rate control scale factors of the rate control table, prior to generating the first bi-level video frame from the input video (process action 800). The bi-level video frames are then generated in sequence using the selected threshold band width and dissimilarity threshold (process action 802), as described previously. Each bi-level frame generated is selected in the sequence they are generated (process action 804), and encoded using the adaptive context-based arithmetic coding technique described previously (process action 806). The resulting data is buffered pending its output, as indicated in process action 808. The goal is to maintain the average bit rate of the output bit stream to less than or equal to a target bit rate consistent with the previously described low bandwidth devices. To this end, the buffer size B is defined as $$B = I_{max} + 4r/n,$$ (4)

where $I_{max}$ is the maximum number of bits per frame that it is allowed to send to the buffer, r is the maximum video bit rate during the connection in bits per second, and n is the effective frame rate. If the I-frame interval is $\tau$, the number of frames in the I-frame interval is $\tau n$. A group of pictures is defined as an I-frame and all the ($\tau n - 1$) p-frames in the interval. The bits that are assigned to the whole group of pictures are $r\tau$. Suppose that the I-frame consumes $b_i$ bits. The bits left to each p-frame is $b_p = (r\tau - b_i)/(\tau n - 1)$. The mechanism of the buffer management is that it is ensured the I-frame in each group of pictures, i.e. as soon as an I-frame is input into the buffer, the same size of bits is immediately removed from the buffer. In an extreme case, if the size of an I-frame is larger than all the bits assigned to the whole group of pictures, the bits that will be assigned to the next group of pictures are used together. For the rest of the p-frames in the group of pictures, after a P-frame is inserted into the buffer, $b_p$ bits are removed from the buffer. This arrangement guarantees equivalence of the output bit-rate. As the data associated with each selected frame is buffered, it is determined if the accumulated bits exceed the half-size of the buffer by 15% (process action 810). Whenever the accumulated bits exceed the half-size of the buffer by 15%, it is next determined if the accumulated bits exceed the total buffer size (process action 812). If so, the bits associated with the current frame are deleted from the buffer (process action 814). In addition, the rate control scale factor f is set to its top value, whatever its current value happens to be (process action 816). If, however, the accumulated bits do not exceed the total buffer size, then the currently selected rate control scale factor f is increased by one, unless it is already at the top level (process action 818). If the half-size of the buffer is not exceeded by 15%, then it is determined whether the accumulated bits are lower than the half-size of the buffer by 15% (process action 820). If not, it is next determined whether the selected bi-level frame is the last frame (process action 828). If it is, the process ends. Otherwise, the next frame is selected for encoding (process action 804). However, whenever the accumulated bits are lower than the half-size of the buffer by 15%, the rate control scale factor f is decreased by one, unless it is already at the bottom level (process action 822). It is noted that because the foregoing process will not have the problem of underflow, the buffer will be prevented from becoming empty when there are fewer bits generated. As indicated in process action 824, it is next determined if the above actions resulted in a change to the rate control scale factor. If not, then it is again determined if the selected bi-level frame is the last frame (process action 828). If so, the process ends. If not, the next frame is selected for encoding (process action 804). Conversely, if it is determined that the rate control scale factor was changed, then the values for the width of threshold band and the dissimilarity threshold associated with the new scale factor are read from the rate control table, and selected as the current values for use in processing the next frame of the bi-level video, in lieu of the previously selected values (process action 826). It is next determined in process action 828 whether the currently selected frame is the last frame of the bi-level video. If it is the last frame, the process ends. If not, then the next frame is selected for encoding (process action 802), and the process of actions 804 through 828 are repeated as appropriate. The net result of the foregoing process is that the average bit rate is maintained less than or equal to a target bit rate, as desired. It is noted that while the foregoing rate control process indicated that the rate control scale factor is not changed unless the accumulated bits in the buffer were found to exceed or fall below the half size of the buffer by 15%, other percentages could be employed as desired. For instance, any percentage less than 50% could be employed without detrimental effect.

It is noted that another difference between the present adaptive context-based arithmetic encoding scheme and standard MPEG4 Shape Coding is that a lossy mechanism is introduced with a view to the specific scenarios of video communication. Specifically, the half-width of threshold band is determined in rate control process described above, and then used in the adaptive context-based arithmetic encoding process. For those pixels whose confidence levels fall within the threshold band, the bi-level values of the pixels are assigned according to the indexed probability in probability table. Therefore a higher compression ratio can be reached.

1.2. Playing the Bi-Level Video

The transmitted bi-level video generated in accordance with the foregoing generating process will be processed by a receiving device. The receiving device essentially "plays" the bi-level video by decompressing it and then displaying the decompressed image frames in sequence. In addition, if the receiving device has sound producing capability (such as via a speaker, or an audio output connected to a earphone or the like), the receiver will also decompress and play the audio components of each frame of the bi-level video. To take full advantage of the present invention, the receiving device itself is preferably one of the previously mentioned low bit-rate devices such as a hand-held PC, palm-sized PC, or mobile telephone. However, it is not intended to limit the invention to such devices. Rather, in general, a bi-level video can be played on any device having a processor capable of decoding the incoming video data and a display capable of displaying bi-level images, regardless of its bandwidth capability, such as for instance a desktop PC or laptop PC.

Figure 9:
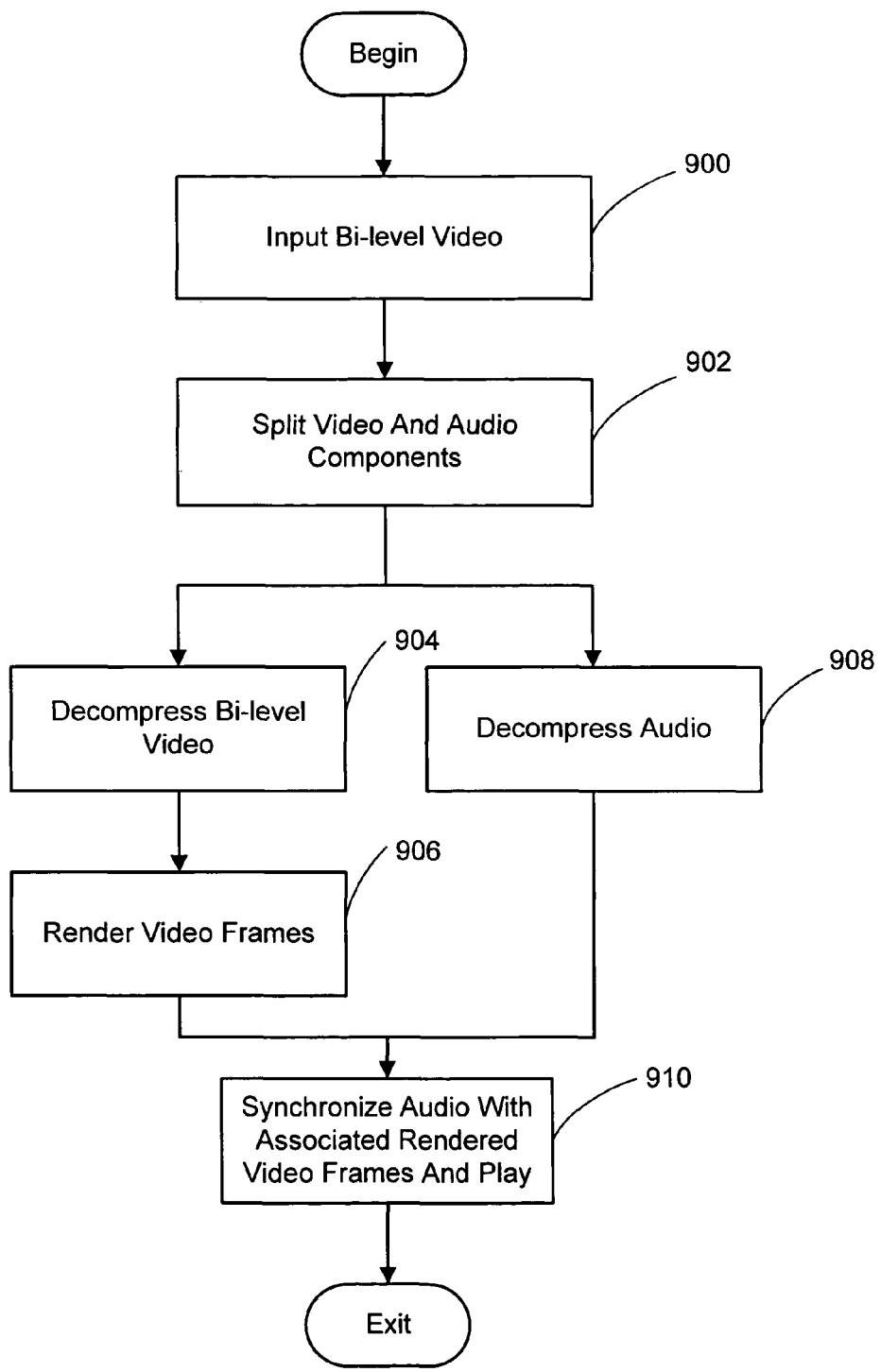
FIG. 9 is a flow chart diagramming an overall process for playing a bi-level video according with the present invention.

The process for playing a bi-level video generated in accordance with the present invention will be described in reference to FIG. 9. The playing process begins by receiving the transmitted bi-level video (process action 900). This will entail either receiving a bi-level video file, or a bit stream containing the video data. As discussed previously, the bi-level video will have been encoded for transmission over the desired medium. For example, it might have been packetized for transmission over the Internet in video broadcast or communication applications. Thus, the task of receiving a bi-level video includes unpacking the data using the standard unpacking technique appropriate for the transmission medium. Next, the bi-level video data is split to separate its audio and video components (process action 902), if applicable. This results in compressed bi-level video image frame data and an associated audio data component. A conventional AVI splitter can be used to accomplish this task.

The video image frame data will preferably be in a compressed form, and so must be decompressed before being played. As discussed previously, the image frame data under consideration was preferably compressed via the very low bit-rate bi-level video coding process described in Section 2. If so, the image frame data is decompressed with a bi-level video decompressor applicable to the aforementioned very low bit-rate bi-level video coding scheme (process action 904). Essentially, this decompressor is an adaptive, context-based, arithmetic decoding module. However, it is noted that the decoding module is configured to decode using any of the probability tables discussed above in connection with the coding of the bi-level video. The particular table used to code the data is identified by the decoder in the bit stream or data file associated with the compressed video or generated by the same procedure as in the encoder. In addition, the decoding module is configured to employ the same two-frame template used in the encoding process described above.

Further, since the encoded bi-level video preferably includes both I-frames and p-frames as described previously, before any decoding takes place the decoding module designates the first bi-level image frame received, and frames in the frame sequence occurring at the aforementioned prescribed interval, as I-frames. Those bi-level image frames in the frame sequence falling between a pair of consecutive I-frames are designated as p-frames. The I-frames and p-frames are both decoded using the adaptive context-based arithmetic decoding technique and the probability table identified for that frame in the incoming data. However, while the bit stream data associated with an I-frame represents all the pixels in the overall bi-level image frame, the data associated with a p-frame represents only those pixels contained within the previously-described bounding box associated with that p-frame. Accordingly, when the decoding module decodes a p-frame, the location and size of the bounding box in the overall bi-level image frame of a p-frame are read from the incoming data associated with that p-frame. The decoding module then can reconstruct the portion of the overall bi-level frame outside the bounding box by assuming the pixel values in that region are the same as the correspondingly located pixels in the last frame preceding the p-frame being decoded.

As the bi-level video image frames are decoded, they are rendered for display by the receiving device (process action 906). This is accomplished using the standard rendering procedure appropriate for the receiving device.

Concurrently with the decompression and rendering of the bi-level video image frames, the audio components of the frames are also processed. The audio decompression is accomplished using a method appropriate for the method used to compress it. Since the audio data was preferably compressed using the previously-described very low bit-rate audio compression methods, this last action will entail decompressing audio data compressed using a decompression technique appropriate for the very low bit-rate audio compression method employed (process action 908). Once decompressed, audio component associated with each bi-level video frame is synchronized with that frame (process action 910) and both are "played" (process action 912).

2. Generating and Playing Sketch Video

As with the process for generating bi-level video, the process of generating sketch video is preceded by obtaining or capturing an input video that will typically contain both audio and video components. Again, the input video can be either a color video or a gray-scale video. In addition, the video could be initially captured with a digital video camera. In that case, the video can be input directly, via an appropriate interface, into a computing device that is to be used to encode it. Alternately, the video could be captured using a non-digital camera, and then digitized via conventional methods before being input into the computing device for encoding. In a video broadcast application, the video capture process could be either real-time or offline, while in a communication application, the video capture process must be real-time.

Figure 10:
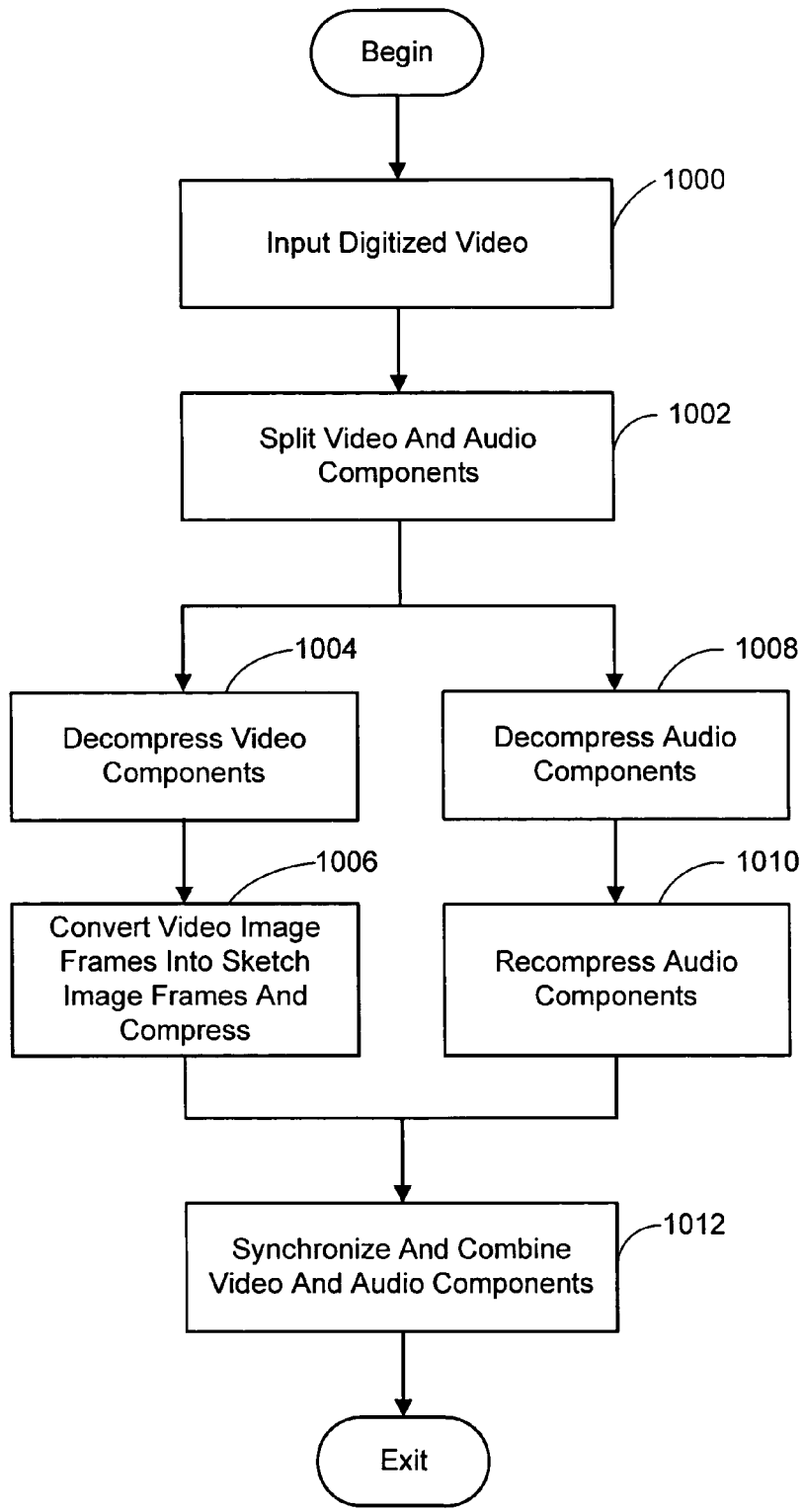
FIG. 10 is a flow chart diagramming an overall process for generating a sketch video according with the present invention.

The sketch video generating process begins just as it did in the generation of bi-level video described previously. Specifically, referring to FIG. 10, the aforementioned digitized full-color or gray scale video is input (process action 1000). The input video is then split into its audio and video portions (process action 1002). The splitting can be accomplished using any conventional audio-video splitting method. Typically, the input video will have been compressed using some conventional video compression process. Thus, once split, the video portion of the frame, which constitutes image frames of the video, is decompressed if necessary (process action 1004). Standard decompression techniques are employed for this task and will depend on the process used to initially compress the input video. It is noted that since this last action is performed only when the input video is compressed, it is an optional step.

Next, the video image frames are converted into sketch image frames and compressed (process action 1006) using a unique coding system and process, which will be described in detail in Section 2.1. This portion of the process is very different from coding associated with generating a bi-level video. However, while the video components of the input video frames are being decompressed, and then recompressed, the audio component of the frame can be processed concurrently. This procedure is the same as that employed in the generation of bi-level video. Specifically, the processing of the audio component of each input video frame entails decompressing the audio data if necessary using standard methods specific to the type of audio compression used to compress the data (process action 1008). Preferably this decompression would also include a standard noise reduction procedure. The audio data is then recompressed (process action 1010). In this case it is preferred that a very low bit-rate audio compression method be employed to minimize the amount of data that must be transmitted. Some currently available examples of this type of audio noise compression were identified previously in connection with the generation of bi-level video in accordance with the present invention.

After the video part of sketch video has been generated and compressed, and the audio data has been compressed, the audio and video components are synchronized and combined to produce a complete sketch video, as indicated by process action 1012. Any appropriate existing AVI multiplexing technique can be used for this purpose, such as AVI Mux in Microsoft DirectMedia 6.0. The completed sketch video can be in the form of a video file or can take the form of a bit stream. The video file can be used in a broadcast application where the broadcast of the video is to take place sometime after its generation. The bit stream from of the video could be used for an immediate broadcast application, or for a video communications application. It is noted that in the case of the bit stream, the sketch video generation process can be viewed as a sequential process with the foregoing actions being performed on each frame or a group of frames of the input video. As portions of the overall sketch video are generated, they are transmitted thus creating the aforementioned bit stream.

In order to transmit the sketch video over a network to a receiving device, either from a previously generated file or as a real time bit stream, the video data will typically have to be prepared first using a packetizing technique applicable to the transmission method. For example, if the sketch video is to be transmitted over the Internet, the data would be packetized via Internet protocols.

2.1. Sketch Video Image Frame Coding

Figure 11:
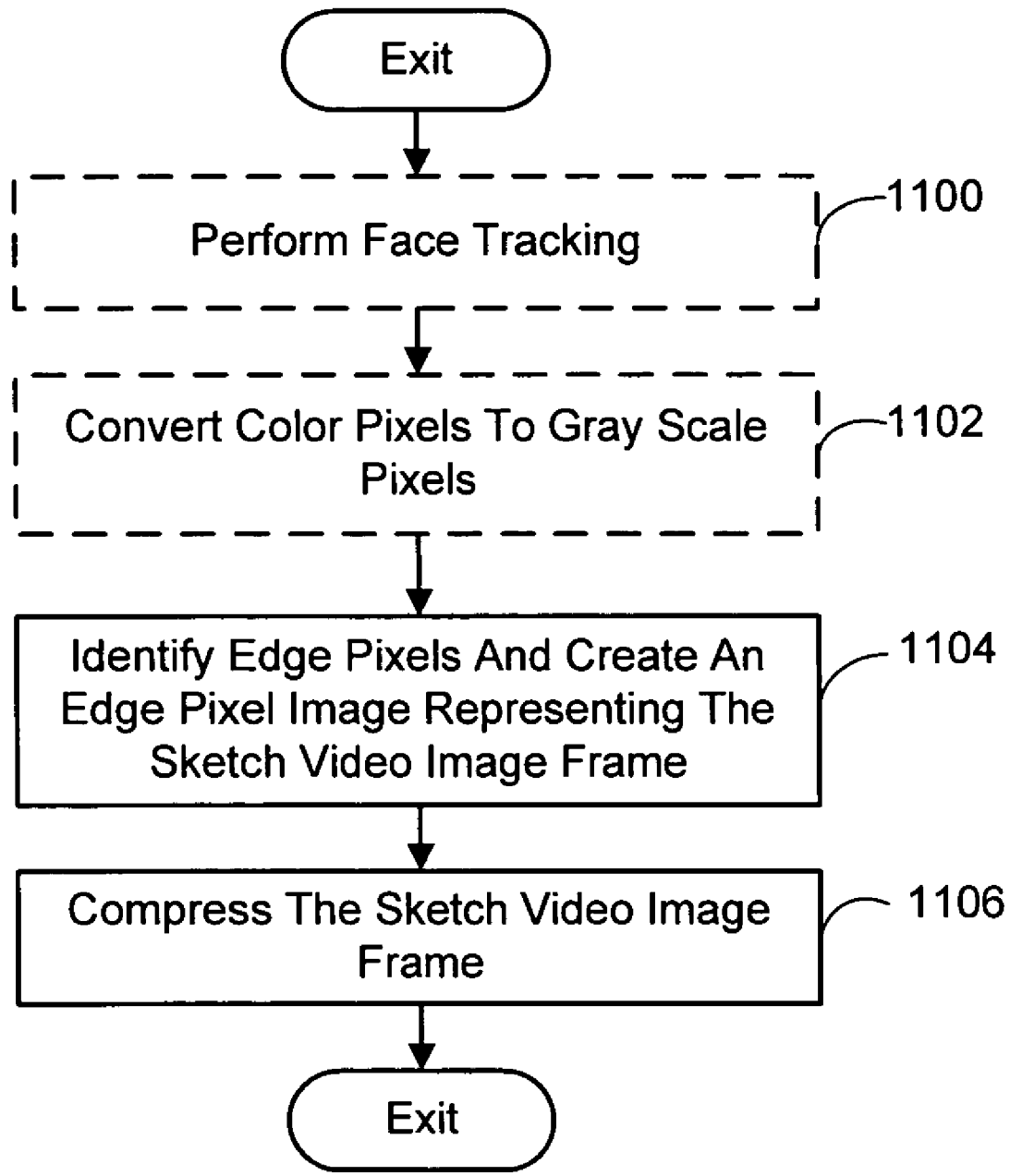
FIG. 11 is a flow chart diagramming a process for encoding the image frames of an input video to create a sketch video as part of the overall process of FIG. 10.

The sketch image frame encoding process generally begins by transforming the image portion of each frame of the input video into a bi-level video frame and then a sketch video frame. Specifically, referring to FIG. 11, the first action is an optional action—namely a face tracking procedure (process action 1100). This procedure is advantageously used where the video being encoded consists of a person speaking, such as in a video of a lecture or speech. Typically, only the speaker is of interest, and not the background. Thus, an opportunity exists to eliminate some of the video data that must be encoded and transmitted by eliminating this unwanted background. Any appropriate face detection and tracking technique can be employed for the foregoing purpose. However, it is preferred that the technique used scale the resulting face region of the speaker so as to fill substantially the entire image frame.

Next, the input video image frame is converted from color to gray scale, if it was originally captured in color (process action 1102). The converted image frame (or the original image frame if initially captured in gray-scale), then undergoes an edge detection procedure in which the edge pixels of the objects depicted in the image frame are identified (process action 1104). The resulting edge pixel image represents the aforementioned sketch image frame. Any appropriate existing edge detection method can be employed for this purpose. It should be noted that edge detection procedure could alternately be applied to the original color image frame if desired.

The sketch image frames could be transmitted as is, however, it is preferred that they first be compressed to further reduce the bandwidth required to transmit the resulting video (process action 1106). One method that could be employed to compress the sketch image frames involves using JBIG, MPEG shape coding or the aforementioned bi-level video coding. For example, bi-level video coding procedure could be performed on each sketch image frame to reduce the amount of data that must be transmitted. It is noted that the sketch image frame is essentially a special case of a bi-level image. As such other compression methods applicable to bi-level images could also be implemented. This would include lossy methods as long as any resulting degradation in the resolution of the decoded frame is acceptable to the user.

Figure 12:
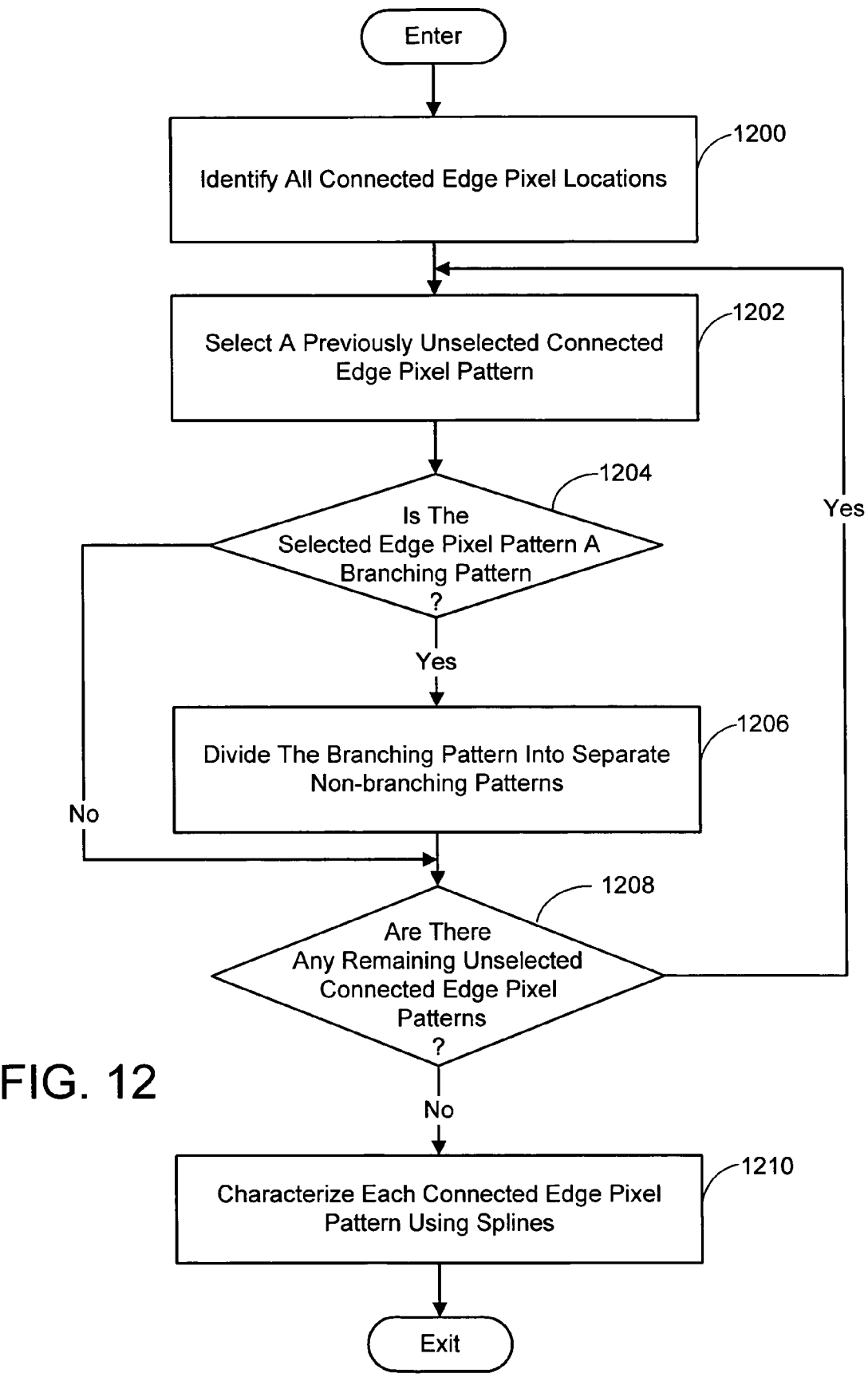
FIG. 12 is a flow chart diagramming a process for the vectorization compression technique optionally implemented as part of the overall process of FIG. 11.

Another type of compression methods that could be used involves vectorizing the sketch image frames. This vectorization process is outlined in FIG. 12. The first action 1200 in the vectorization process is to scan each image frame in turn, pixel by pixel, to identify all "connected" edge pixel locations. Preferably, only those edge pixel that are found to be adjacent to each other horizontally, vertically or diagonally (i.e., a 8-connected region) are identified. In some cases the scan identifies patterns of connected edge pixels that include one of more branches. These branching patterns are preferably segmented. Accordingly, the next action 1202 in the vectorization process is to select a previously unselected one of the connected edge pixel patterns. A connected edge pixel pattern is one in which all the edge pixels are adjacent to at least one other edge pixel. It is then determined whether the currently selected pattern is a branching pattern, as indicated by process action 1204. A branching pattern is one where at least one of the edge pixels is adjacent to more than two other edge pixels. If the selected pattern is a branching pattern, it is arbitrarily divided into separate non-branching connected patterns (process action 1206). Next, it is determined if there are any remaining previously unselected patterns (process action 1208). If so, then process actions 1202 through 1208 are repeated for each remaining unselected pattern. Once the connected edge pixel patterns are defined, the next phase of the vectorization process is to characterize each of the patterns using spline techniques (process action 1210). In this way, each of the patterns are characterized by a spline and its associated set of control point locations which correspond to certain pixel locations. In tested embodiments of the vectorization process, Bezier splines were employed. However, other types of splines can be use, such as B-splines. A mixture of different splines could also be employed as some spline types will characterize certain patterns better that others. If a mixture of splines is used, then an indicator identifying the spline type would be included with the control point data associated with each pattern to facilitate the decoding of the vectorized image frame.

The vectorized sketch video can also be represented by I-frames and p-frames. For each I-frame, the hierarchy of splines and the positions of all the control points of splines are recorded and compressed using conventional coding methods such as Huffman coding. For each P-frame, only the differences of hierarchy or topological structures between current frame and previous frame and shift of control points of splines are recorded and compressed using conventional coding methods such as Huffman coding.

While the video component of the input video is decompressed, converted and then recompressed, the audio component of the input video can be processed concurrently. The processing of the audio component entails decompressing the audio data using standard methods specific to the type of audio compression used to compress the data. Preferably this decompression would also include a standard noise reduction procedure. The audio data is then recompressed. In this case it is preferred that a very low bit-rate audio compression method be employed to minimize the amount of data that must be transmitted.

After the compressed sketch video has been generated, and its associated audio data has been compressed, the audio and video components are synchronized and combined to produce a complete sketch video. This completed sketch video is ready to be transmitted. Transmitting the video entails packaging the sketch video using the packetizing technique applicable to the transmission method. For example, if the sketch video is to be transmitted over the Internet, the data would be packetized via Internet protocols.

2.2 Playing the Sketch Video

The broadcasted sketch video generated in accordance with the foregoing encoding process is processed by a receiving device. The receiving device "plays" the sketch video by decompressing it and then displaying the decompressed image frames in sequence. In addition, if the receiving device has sound producing capability (such as via a speaker, or an audio output connected to a earphone or the like), the receiver will also decompress and play the audio components of each frame of the sketch video. To take full advantage of the present invention, the receiving device itself is preferably one of the previously mentioned low bit-rate devices such as a hand-held PC, palm-sized PC, or mobile telephone. However, it is not intended to limit the invention to such devices. Rather, in general, a sketch video can be played on any device having a processor capable of decoding the incoming video data and a display capable of displaying bi-level images, regardless of its bandwidth capability.

Figure 13A:
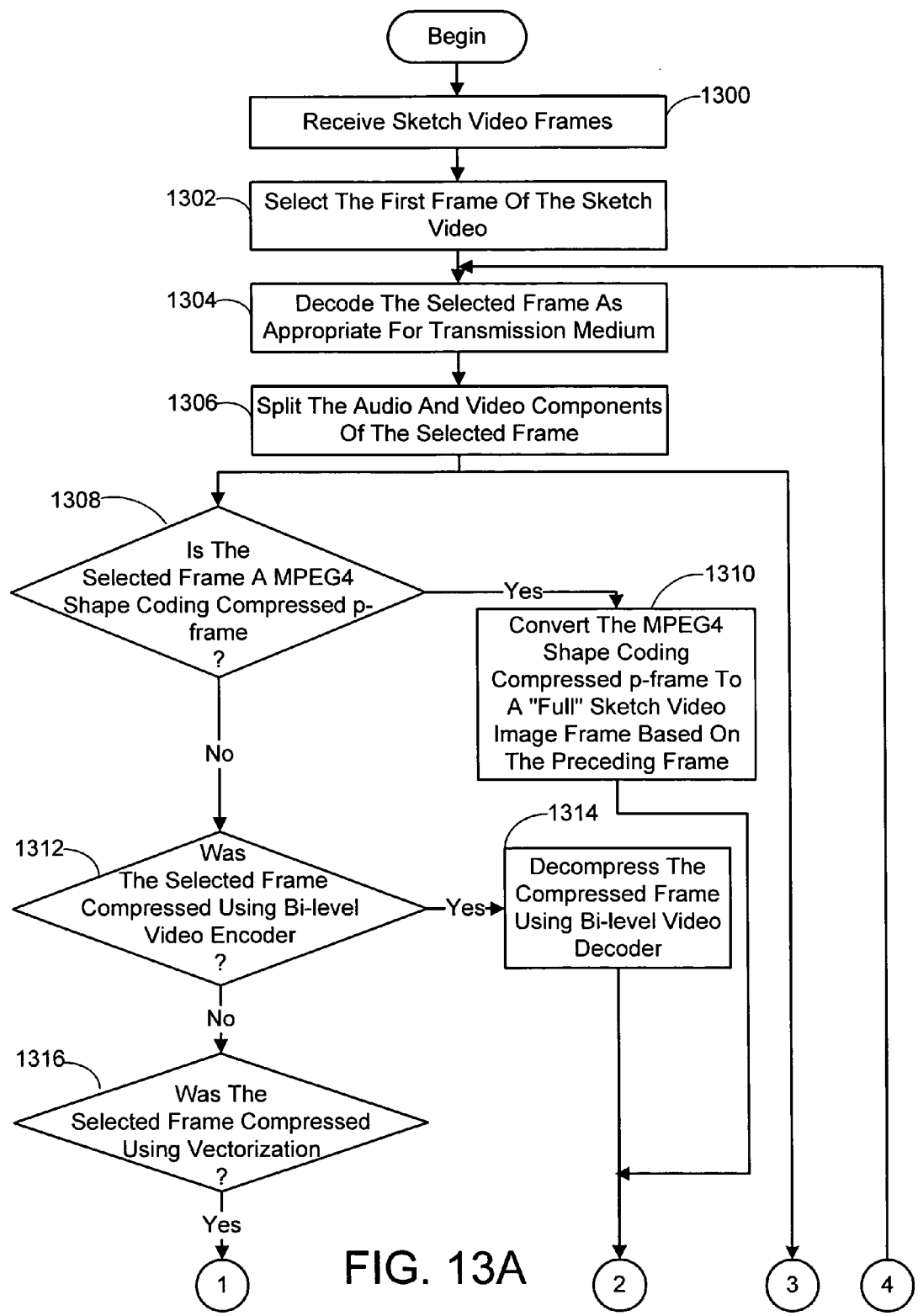
FIGS. 13A and 13B depict a flow chart diagramming a process for decoding a sketch video in accordance with the present invention.
Figure 13B:
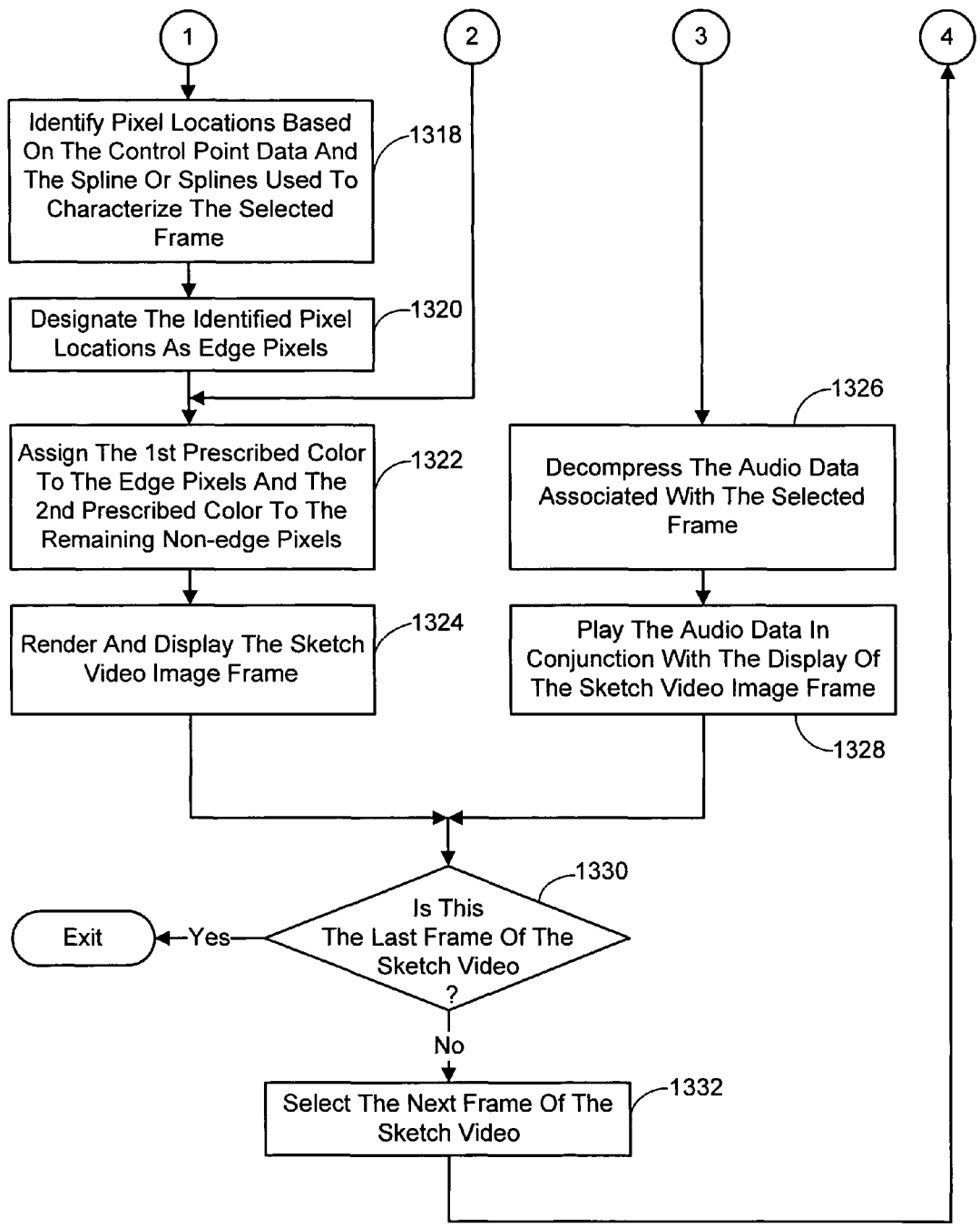

The process for decoding a sketch video generated in accordance with the present invention will be described in reference to FIGS. 13A and 13B. The decoding process begins by receiving the broadcasted sketch video (process action 1300) and selecting the first frame of the video (process action 1302). The first action can be performed by receiving the entire video and storing it in the receiver, or more practically, receiving and processing each frame of the sketch video on an ongoing basis. As discussed previously, the sketch video will have been packetized for transmission over the desired medium. For example, it might have been packetized for broadcast over the Internet or for transmission to a mobile telephone. Thus, the task of playing a sketch video includes unpacking the data using the standard unpacking technique appropriate for the transmission medium (process action 1304). Next, the sketch video frame data is split to separate its audio and video components (process action 1306). This results in a sketch video image frame and an associated audio component. A conventional AVI splitter can be used to accomplish this task.

The sketch video image frames will preferably be in a compressed form, and so must be decompressed before they can be played. As discussed previously, the image frame under consideration may have been compressed via a MPEG4 shape coding technique. Thus, the first decompression action is to determine whether the selected sketch video frame is a MPEG4 shape coding compressed p-frame, as indicated by process action 1308. If it is, then the p-frame is converted into a "full" sketch video frame based on its previously received frame (process action 1310). Standard MPEG4 shape coding decoder is employed for this purpose. Of course, this step will be skipped in the case of the first frame of the sketch video since it will be an I-frame, and for any subsequently received I-frame. It should also be noted that if MPEG compression is never employed during the encoding of the sketch video, the last two process actions (1308 and 1310) could be eliminated.

Next, it is determined in process action 1312 whether the sketch video frame was compressed using a bi-level video encoder. If the sketch video image frame was compressed using a bi-level video encoder, then each image frame is decompressed using the standard decompression procedure associated with the compression technique employed (process action 1314). However, if the sketch video image frame was not compressed using a bi-level video encoder, it is determined whether it was compressed using the previously-described vectorization procedure (process action 1316). If so, the image frame is decompressed as follows. Essentially, the sketch image frame is reconstructed based on the spline and its associated control points that were used to respectively characterize the connected edge pixel patterns of the original image. This entails using each set of control points and the spline employed to generate them to identify a series of pixel locations in the reconstructed image frame (process action 1318). These pixel locations are designated as the edge pixels (which define the sketch image frame) as indicated by process action 1320. It is noted that if a mixture of different spline types were employed to characterize the various edge pixel patterns in the sketch image frame being decompressed, then the incoming image data will include an indicator of the type of spline that was used to generated the corresponding control points for each characterized pattern. In such a case, the receiver will first identify the type of spline employed before computing the edge pixel locations for the characterized pattern in the reconstructed sketch image frame. If a single spline type was used to characterize each edge pixel pattern in the image frame, then the just-described indicator method can be employed, or the receiver can simply be programmed to always employ the particular spline type associated with the incoming vectorized image frames.

It is noted that while compressing the edge pixel images constituting the sketch video using a bi-level image compression technique or vectorization is preferred, it could be skipped in the encoding process. In such a case, it will be determined that neither compression method was used and the decoding process will continue as indicated in FIG. 13B. Further, the non-MPEG4 shape coding decompression phase of the decoding process has been described as assuming that the incoming sketch video was compressed using either the bi-level image or vectorization techniques (or neither). However, it may be decided that only one of the techniques will be employed in the encoding of the sketch video. If this is the case, the process actions associated with detecting and decompressing the unused technique can be eliminated from the decoding process. Thus, it would be determined if the prescribed compression process had been employed. If it had, then the appropriate decompression actions would be taken. If the prescribed compression technique was not employed, it would be assumed no compression was implemented and the decoding process would proceed without performing any decompression actions.

The last action 1322 of the decoding process involves assigning a first of two colors chosen for displaying the sketch video to each of the previously designated edge pixels, and assigned the other of the two colors to the remaining pixels not designated as edge pixels. As with the bi-level images frames encoded using the previously-described very low bit-rate bi-level video coding technique, the preferred choices for the first and second sketch video colors are black and white, respectively. However, it is not intended to limit the invention to just black and white pixels. Rather, like the very low bit-rate bi-level video coding technique, other colors could also be chosen as desired. The first of the two chosen colors would preferably be the darker of the two. In addition, the second color should contrast the first to the extent that the two colors are readily discernable to a person viewing the sketch video.

Once the sketch video image frame has been decoded, it is rendered and displayed by the receiving device (process action 1324). This is accomplished using the standard rendering procedure appropriate for the receiving device.

Concurrently with the decompression of the sketch video image frames, the audio components of the frames are also processed. This entails first decompressing the audio component of the selected sketch video frame, as indicated by process action 1326. The audio decompression is accomplished using a method appropriate for decompressing audio data compressed using the previously-described lowest bit-rate audio compression method. Once decompressed, each audio component is played in conjunction with the display of the sketch video image frame associated with the audio component (process action 1328).

The foregoing decoding, rendering and display process is repeated for each of the remaining frames of the sketch video received. Specifically, it is first determined if the currently selected frame is the last frame of the sketch video, as indicated by process action 1330. If it is not the last frame, then the next frame of the sketch video is selected (process action 1332) and actions 1304 through 1332 are repeated as appropriate. This continues until the last frame of the sketch video is received and processed.

3. Broadcast with Bi-level or Sketch Video

Broadcast using a bi-level video generated in accordance with the foregoing procedures involves at least one sender and one receiver. The sender or receiver can be one of the previously mentioned low bit-rate devices such as a hand-held PC, palm-sized PC, or mobile telephone. Although, in general, the sender or receiver can be any device having a processor capable of coding and decoding the incoming video data respectively, regardless of its bandwidth capability, such as for instance a desktop PC or laptop PC.

Figure 14:
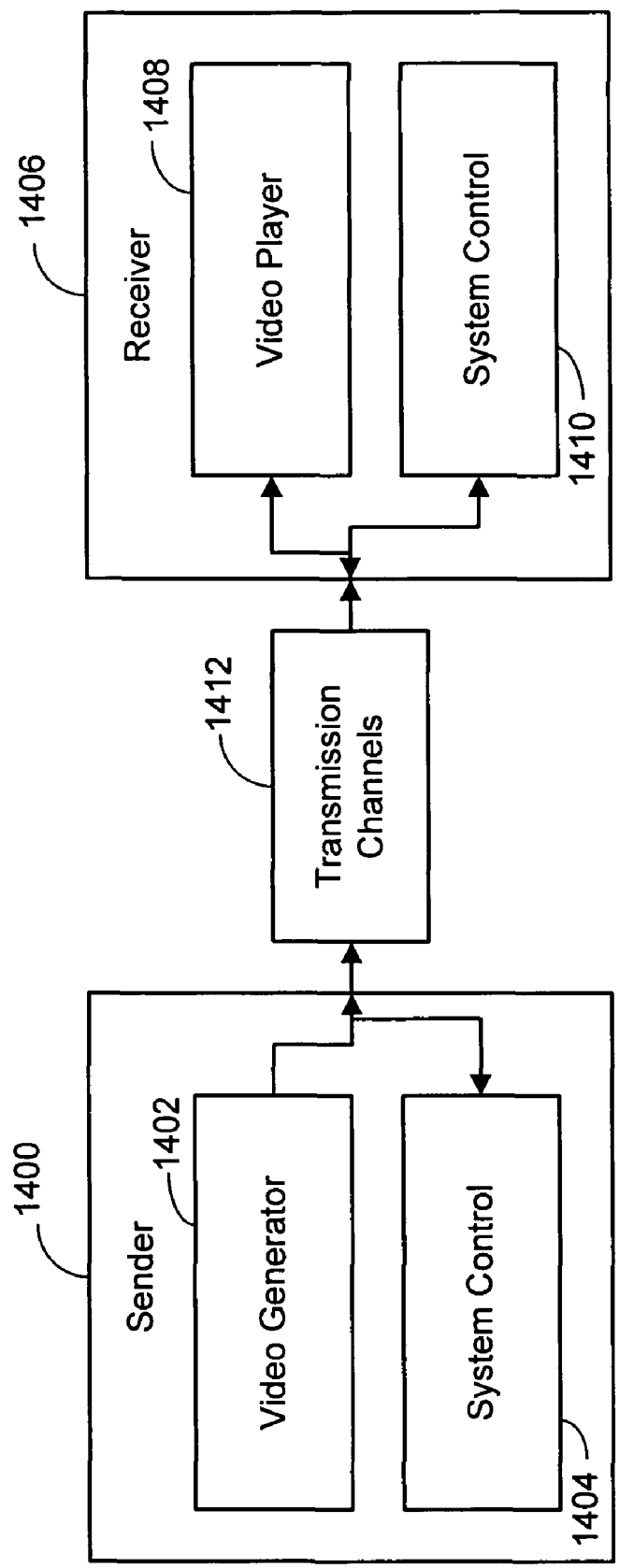
FIG. 14 is a block diagram illustrating a bi-level or sketch video broadcast system and the structures of its components such as a sender and receiver.

As illustrated in FIG. 14, the sender 1400 is composed of a video generator module 1402, which can be the bi-level video generator described in Section 1 above or the sketch video generator described in Section 2. The sender 1400 also includes the conventional system control parts 1404 typical of such a device [6, 7, 8]. The receiver 1406 is composed of a video player module 1408, which can be the bi-level video player described in Section 1.2 or the sketch video player described in Section 2.2, as well as the conventional system control parts 1410 typical of such a device [6, 7, 8]. Bi-level or sketch videos are transmitted via conventional transmission channels 1412. The transmission channels 1412 could be wired or wireless local area networks, or wired or wireless wide area networks (such as the Internet) that can connect senders 1400 and receivers 1406. Besides one sender and one receiver, there can be multiple senders and multiple receivers connected to transmission channels. Therefore, each sender could send bi-level or sketch video to multiple receivers and each receiver could subscribe to multiple senders. In broadcast application, the video capture process could be either real-time or offline.

4. Communication with Bi-level or Sketch Video

Communication with bi-level or sketch video is consists of at least two communicators connected to conventional transmission channels. The communicator can be one of the previously mentioned low bit-rate devices, or more powerful devices such as a desktop PC or laptop PC. In general, the communicator can be any device having a processor capable of decoding the incoming video data and at least coding audio, regardless of its bandwidth capability.

Figure 15:
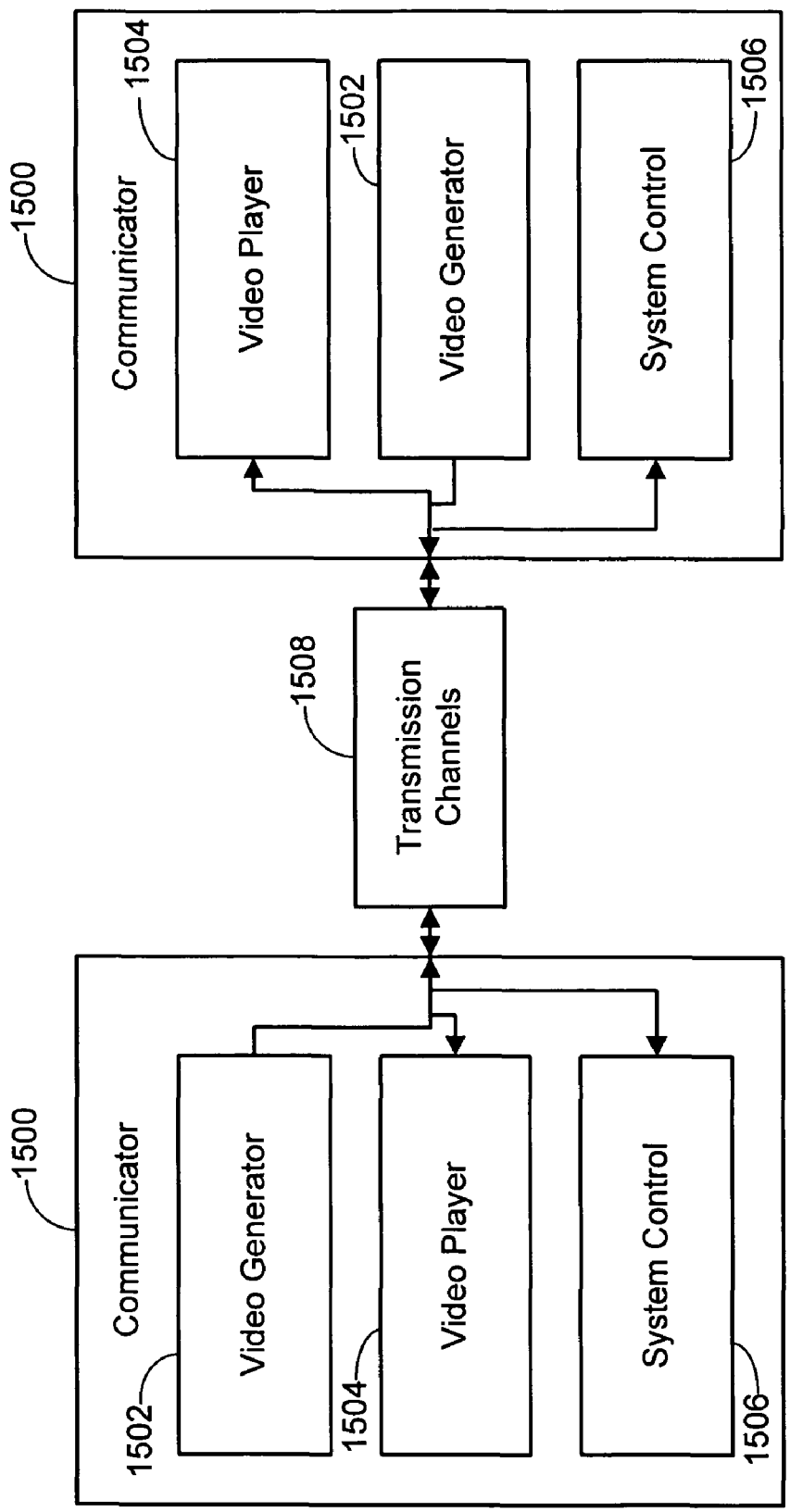
FIG. 15 is a block diagram illustrating a bi-level or sketch video communication system and the structures of its components such as a communicator.

As illustrated in FIG. 15, each communicator 1500 is composed of a video generator 1502, a video player 1504, as well as the conventional system control parts 1506 of a communicator [6, 7, 8]. Bi-level or sketch videos are transmitted via the transmission channels 1508. Here again, the transmission channels 1508 could be any channels such as wired or wireless local area networks, or wired or wireless wide area networks (such as the Internet), that can connect communicators. There can also be multiple communicators connected to transmission channels. Therefore, each communicator could send bi-level or sketch video to any other communicators or receive bi-level or sketch video from any other communicator. In some cases, communicators possess both audio and video capture and sending capacity, and can send and receive both of audio and video. A bi-level video phone is an example of such a device. In some other cases, communicators may only possess either audio capture and sending capacity or video capture or sending capacity, and so can receive both of audio and video but can only send either audio or video. In one embodiment of the invention, the communicators are embodied in PCs, which can send and receive both of audio and video. In another embodiment of the invention, the communicators are embodied in Pocket PCs that can receive both of audio and video but can only send audio. All of these kinds of communicators can be connected to transmission channels and communicate with each other.

5. Alternate Embodiments

While the invention has been described in detail by specific reference to preferred embodiments thereof, it is understood that variations and modifications thereof may be made without departing from the true spirit and scope of the invention. For example, it has been described previously that the generation of either bi-level video or sketch video can entail an initial process action of converting a color input video into a gray-scale video. The procedures that followed then manipulated the gray-scale video to produce either a bi-level or sketch video. However, it would also be possible to convert the color video into a video whose frames have pixels defined in terms of some other conventional combination of the R, G and B color channels, other than a gray-scale representation. The combined pixel values would then be processed in the same way as the gray-scale pixels in order to produce the bi-level or sketch video.

In addition, the confidence levels assigned to each pixel location of each frame during the previously-described adaptive thresholding procedure need not be binary values. Alternately, the confidence levels could be defined in terms of the difference between the gray scale value of the pixel and the binarization threshold so that a more precise expression of the confidence level of the pixel can be achieved.

REFERENCES

1. ISO/IEC DIS 13818-1 Information technology—Generic coding of moving pictures and associated audio information: Systems
2. ISO/IEC DIS 13818-2 Information technology—Generic coding of moving pictures and associated audio information: Video
3. ISO/IEC 13818-3:1995 Information technology—Generic coding of moving pictures and associated audio information—Part 3: Audio
4. ITU-T Recommendation H.263 Video coding for low bit rate communication, 02/98
5. T. W. Ridler and S. Calvard, Picture Threshold Using an Interative Selection Method. IEEE Transactions on System, Man, and Cybernetics. Vol. SMC-8, 8:630-632.
6. ITU-T Recommendation H.323 Pocket-based multimedia communications systems, 09/99
7. ITU-T Recommendation H.245 Control protocol for multimedia communication, 05/99
8. ITU-T Recommendation H.225 Call signaling protocols and media stream packetization for packet-based multimedia communication systems, 09/99
9. ISO/IEC JTC1/SC29/WG1 (ITU-T SG8), Coding of Still Pictures, 07/99
10. ISO/IEC JTC1/SC29/WG11 N3312 Coding of moving pictures and audio March 2000/Noordwijkerhout.

Wherefore, what is claimed is:

1. A computer-implemented process for generating a bi-level video, comprising:
using a computer to perform the following process actions:
inputting digitized video comprising a sequence of video image frames;
converting the input video image frames into bi-level image frames; and
encoding the bi-level image frames.

2. The process of claim 1, wherein the input video image frames have been compressed using a prescribed compression technique to facilitate storage or transmission, and wherein the process for generating the bi-level video further comprises an action of decompressing the input video image frames using a decompression technique appropriate for the prescribed compression technique, said decompression action being performed prior to the action of converting the input video image frames into bi-level image frames.

3. The process of claim 1, wherein the inputted digitized video further comprises an audio component associated with each image frame, and wherein the process for generating a bi-level video further comprises the actions of:

splitting the input video to separate the audio components from the image frames, prior to converting the image frames into bi-level image frames;
encoding the audio components using a low bit-rate audio compression technique;
synchronizing and combining each audio component with the bi-level image frame that was derived from the input video image frame associated with the audio component.

4. The process of claim 3, wherein the audio components have been compressed using a prescribed compression technique to facilitate storage or transmission, and wherein the process for generating the bi-level video further comprises an action of decompressing the audio components using a decompression technique appropriate for the prescribed compression technique, said decompression action being performed prior to encoding the audio components using the low bit-rate audio compression technique.

5. The process of claim 4, wherein the process actions of decompressing and encoding the audio components are performed concurrently with the process actions of converting the input video image frames into bi-level image frames and encoding the bi-level image frames.

6. The process of claim 1, wherein the digitized video is characterized by pixels defined in terms either a color level or a gray scale level, and wherein the process action of converting the input video image frames into bi-level image frames, comprises the actions of:
ascertaining whether the input video image frames comprises pixels defined in terms of a color level; and
converting each input video image frame so as to define each pixel thereof in terms of one of a plurality of gray scale levels so as to produce a gray scale image frame whenever the pixels are defined in terms of color levels, wherein the particular gray scale level selected to define a pixel is based on the color level of that pixel.

7. The process of claim 6, wherein the process action of converting the input video image frames into bi-level image frames, comprises, for each bi-level image frame, the actions of:
computing a threshold gray scale level;
assigning a first of two colors to those pixels that exhibit a gray scale level equal to or exceeding said threshold; and
assigning the second of said two colors to those pixel exhibiting a gray scale level that is less than said threshold.

8. The process of claim 1, wherein the process action of encoding the bi-level image frames, comprises an action of encoding the bi-level frames employing an adaptive context-based arithmetic coding technique.

9. The process of claim 1, wherein the process action of encoding the bi-level image frames, comprises the actions of, for each bi-level image frame:
encoding the bi-level frame employing an adaptive context-based arithmetic coding technique which utilizes a ½ probability table;
encoding the bi-level frame employing an adaptive context-based arithmetic coding technique which utilizes a pre-trained probability table;
determining whether the encoding utilizing a ½ probability table or the encoding utilizing a pre-trained probability table produces a bit stream with the lowest bit rate;
designating the bit stream produced using the probability table determined to produce the lowest bit rate as representing the encoded bi-level frame; and incorporating in the bit stream designated as representing the encoded bi-level frame an indicator of the type of probability table used to encode the bit stream.

10. The process of claim 1, wherein the bi-level video is to be transmitted over a medium requiring a prescribed transmission encoding scheme, and wherein the process for generating a bi-level video further comprises a process action of packetizing the bi-level image frames in accordance with the prescribed packetizing scheme applicable to the medium over which the bi-level video is to be transmitted.

11. The process of claim 4, wherein the bi-level video is to be transmitted over a medium requiring a prescribed transmission packetizing scheme, and wherein the process for generating a bi-level video further comprises a process action of packetizing the combined bi-level frames and audio components in accordance with the prescribed packetizing scheme applicable to the medium over which the bi-level video is to be transmitted.

12. A system for generating a bi-level video, comprising:
a video camera;
a sending device capable of transmitting encoded bi-level image frames and audio data and having a general purpose computing device; and
a computer program comprising program modules executable by the computing device, wherein the computing device is directed by the program modules of the computer program to,
input digitized video captured using said video camera, said video comprising a sequence of video image frames each with an associated audio component;
split the input video to separate the audio components from the image frames;
convert the input video image frames into bi-level image frames;
encode the bi-level image frames;
encode the audio components;
synchronize and combine each audio component with the bi-level image frame that was derived from the input video image frame associated with the audio component to produce a sequence of encoded bi-level video frames;
transmit each encoded bi-level video frame in sequence.

13. The system of claim 12, wherein the video camera is a digital video camera and the digitized video is input into the computing device directly from said camera through an appropriate interface.

14. The system of claim 12, wherein the video camera is a non-digital video camera and the images captured by the camera are digitized prior to being input into the computing device.

15. The system of claim 12, further comprising a receiving device which is capable of receiving and decoding bi-level video frames, displaying bi-level video image frames and playing audio data.

16. The system of claim 12, wherein the sending device is one of a (i) hand-held Personal Computer (PC), (ii) palm-sized PC, or (iii) mobile telephone.

17. A computer-readable storage medium having computer-executable instructions stored thereon for generating a bi-level video, said computer-executable instructions comprising:
inputting digitized video comprising a sequence of video image frames;
converting the input video image frames into bi-level image frames, said converting comprising for each input video image frame,
ascertaining whether the input video image frame comprises pixels defined in terms of a color level or a gray scale level,
converting the input video image frame so as to define each pixel thereof in terms of one of a plurality of gray scale levels so as to produce a gray scale image frame whenever the pixels are defined in terms of color levels, wherein the particular gray scale level selected to define a pixel is based on the color level of that pixel,
computing a threshold gray scale level,
assigning a first of two colors to those pixels that exhibit a gray scale level equal to or exceeding said threshold, and
assigning the second of said two colors to those pixels exhibiting a gray scale level that is less than said threshold; and
compressing the bi-level image frames using an adaptive context-based arithmetic coding technique.

18. The computer-readable medium of claim 17, further comprising an instruction for decompressing each input video image, prior to converting each image into a bi-level image, whenever the input video image frames are received in a compressed condition.

19. A computer-implemented process for playing a bi-level video, comprising:
using a computer to perform the following process actions:
receiving the bi-level video in the form of a sequence of frames each of which comprises a bi-level image;
decoding each bi-level image frame;
rendering each decoded bi-level image frame for display by assigning a first of two prescribed colors to pixel exhibiting a first of two binary values and the second of said prescribed colors to all remaining pixels of the image frame; and
displaying each rendered bi-level image frame using the assigned colors and in the sequence in which it was received.

20. The process of claim 19, wherein the first prescribed color is white and the second prescribed color is black.

21. The process of claim 19, wherein the second prescribed color is darker than the first prescribed color.

22. The process of claim 19, wherein the second prescribed color contrasts the first prescribed color to the extent that it is readily discernable by a person viewing the bi-level video.

23. The process of claim 19, wherein the bi-level video is transmitted over a medium requiring a prescribed transmission packetizing scheme, and wherein the process for playing a bi-level video further comprises a process action of unpacking the received frames of the b-level video using a unpacking procedure appropriate for the prescribed transmission encoding scheme.

24. The process of claim 19, wherein the bi-level video image frames have been encoded using an adaptive context-based arithmetic coding technique, and wherein the process action of decoding each bi-level image frame comprises using an adaptive context-based arithmetic decoding technique.

25. The process of claim 24, wherein the adaptive context-based arithmetic decoding technique comprises using a particular initial probability table for each bi-level image frame to predict whether each pixel in the image frame under consideration exhibits one or the other of the two bi-level image frame colors based on the values of a prescribed pattern of previously-predicted pixels, and wherein the process action of decoding the bi-level image frames, comprises the actions of:

receiving in conjunction with each encoded bi-level image frame a indicator specifying of the type of initial probability table that was used to encode that image frame; and employing the indicated type of probability table as the initial probability table in the decoding of the bi-level image frame under consideration.

26. The process of claim 19, wherein the bi-level video image frames have been encoded using an adaptive context-based arithmetic coding technique, and wherein the process action of decoding each bi-level image frame comprises the actions of:

designating the first bi-level image frame received and frames in the frame sequence occurring at a known prescribed interval as I-frames;

designating the bi-level image frames in the frame sequence falling between a pair of consecutive I-frames, as p-frames;

decoding each I-frame using an adaptive context-based arithmetic decoding technique; and decoding each p-frame using an adaptive context-based arithmetic decoding technique.

27. The process of claim 26, wherein the adaptive context-based arithmetic coding technique used to encode the bi-level image p-frames comprises determining the smallest bounding box that will surround all regions of dissimilarity in each p-frame, encoding just the portion of the p-frame contained within said bounding box, and incorporating in the bit stream designated as representing the encoded p-frame an indicator specifying the size and location of the bounding box in relation to an overall bi-level image frame, and wherein the process action of decoding each p-frame, comprises the actions of:

receiving in conjunction with each encoded p-frame the indicator specifying of the size and location of the bounding box in relation to the overall bi-level image frame; and assuming all pixels located outside the bounding box in the overall image frame are have the same value as those in the corresponding locations in the last preceding frame.

28. The process of claim 19, wherein each bi-level video frame further comprises an audio data component, and wherein the process for playing a bi-level video further comprises the process actions of:

splitting each bi-level video frame into its constituent audio data component and bi-level image frame, prior to processing the image frame; and playing the audio data associated with a bi-level video frame concurrently with performing the process action of displaying the bi-level image frame associated with that bi-level video frame.

29. The process of claim 28, wherein the audio data component of each bi-level video frame has been compressed using a audio compression technique, and wherein the process for playing a bi-level video further comprises a process action of decompressing the audio data associated with each frame of the bi-level video, prior to playing the audio data, using an audio decompression technique appropriate for the audio compression technique employed to compress the audio data component.

30. A system for playing a bi-level video, comprising:

a receiving device having a display capable of displaying bi-level images and playing audio data and having a general purpose computing device; and a computer program comprising program modules executable by the computing device, wherein the computing device is directed by the program modules of the computer program to, receive the bi-level video in the form of a sequence of frames each of which comprises a bi-level image and an audio data component, split each bi-level video frame into its constituent audio data component and bi-level image frame, decode each bi-level image frame, render each decoded bi-level image frame for display by assigning a first of two prescribed colors to pixel exhibiting a first of two binary values and the second of said prescribed colors to all remaining pixels of the image frame, display each rendered bi-level image frame using the assigned colors and in the sequence in which it was received, and play the audio data associated with each bi-level video frame concurrently with displaying the bi-level image frame associated with that bi-level video frame.

31. The system of claim 30, wherein the audio data component of each bi-level video frame has been compressed using an audio compression technique, and wherein the computer program further comprises a program module for decompressing the audio data associated with each frame of the bi-level video, prior to playing the audio data, using an audio decompression technique appropriate for the audio compression technique employed to compress the audio data component.

32. The system of claim 30, further comprising a sending device which is capable of sending audio data.

33. The system of claim 30, wherein the receiving device is one of a (i) hand-held Personal Computer (PC), (ii) palm-sized PC, or (iii) mobile telephone.

34. A computer-readable storage medium having computer-executable instructions stored thereon for displaying a bi-level video, said computer-executable instructions comprising:

receiving the bi-level video in the form of a sequence of frames each of which comprises a bi-level image encoded using an adaptive context-based arithmetic coding technique;

decoding each bi-level image frame using an adaptive context-based arithmetic decoding technique;

rendering each decoded bi-level image frame for display by assigning a first of two prescribed colors to pixel exhibiting a first of two binary values and the second of said prescribed colors to all remaining pixels of the image frame; and displaying each rendered bi-level image frame using the assigned colors and in the sequence in which it was received.

* * * * *